United States Patent
Iwamoto

(10) Patent No.: US 10,424,815 B2
(45) Date of Patent: Sep. 24, 2019

(54) BATTERY AND BATTERY MANUFACTURING METHOD

(71) Applicant: Panasonic Intellectual Property Management Co., Ltd., Osaka (JP)

(72) Inventor: Kazuya Iwamoto, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 15/465,650

(22) Filed: Mar. 22, 2017

(65) Prior Publication Data
US 2017/0309964 A1    Oct. 26, 2017

(30) Foreign Application Priority Data
Apr. 25, 2016    (JP) .................. 2016-086784

(51) Int. Cl.
H01M 4/04     (2006.01)
H01M 10/0585  (2010.01)
H01M 10/0562  (2010.01)

(52) U.S. Cl.
CPC ..... *H01M 10/0585* (2013.01); *H01M 4/0402* (2013.01); *H01M 4/043* (2013.01); *H01M 10/0562* (2013.01)

(58) Field of Classification Search
CPC .... H01M 4/04; H01M 4/134; H01M 10/0585; H01M 10/0562
See application file for complete search history.

(56) References Cited

U.S. PATENT DOCUMENTS

| | | | | |
|---|---|---|---|---|
| 6,468,693 B1* | 10/2002 | Takami | ............... | H01M 2/0275 429/176 |
| 2014/0216631 A1* | 8/2014 | Teraoka | .............. | H01M 4/1391 156/89.12 |
| 2014/0272537 A1* | 9/2014 | Kretschmar | ...... | H01M 10/0431 429/149 |

FOREIGN PATENT DOCUMENTS

| | | |
|---|---|---|
| JP | 2003-109666 | 4/2003 |
| JP | 2007-273349 | 10/2007 |

(Continued)

OTHER PUBLICATIONS

Machine Translation of: JP 2015/008073 A, Kato et al., Jan. 15, 2015.*
Machine Translation of: JP 2011/096550 A, Nagai, May 12, 2011.*

*Primary Examiner* — Kenneth J Douyette
(74) *Attorney, Agent, or Firm* — McDermott Will & Emery LLP

(57) ABSTRACT

A battery including a positive electrode layer and a negative electrode layer is provided. The positive electrode layer includes a positive electrode current collector, a positive electrode active material layer, and a positive electrode-side solid electrolyte layer; the positive electrode active material layer is arranged in contact with the positive electrode current collector in a region smaller than that thereof; the positive electrode-side solid electrolyte layer is arranged in contact with the positive electrode current collector and the positive electrode active material layer in the same region as that of the positive electrode current collector; the negative electrode layer has the structure similar to that of the positive electrode layer. Since the positive and negative electrode layers are laminated to each other, the positive electrode active material layer faces the negative electrode active material layer with the positive and negative electrode-side solid electrolyte layers provided therebetween.

1 Claim, 21 Drawing Sheets

(56) References Cited

FOREIGN PATENT DOCUMENTS

| | | |
|---|---|---|
| JP | 2011-096550 | 5/2011 |
| JP | 2015-008073 | 1/2015 |

* cited by examiner

BATTERY AND BATTERY MANUFACTURING METHOD

BACKGROUND

1. Technical Field

The present disclosure relates to a battery and a battery manufacturing method.

2. Description of the Related Art

Japanese Unexamined Patent Application Publication No. 2003-109666 has disclosed an all-solid polymer battery structure formed of laminates each having a positive electrode layer, a solid electrolyte layer, and a negative electrode layer. In this all-solid polymer battery structure, the laminates are each formed in such a way that at least one layer of the above three layers is divided into two units in a lamination direction, and the two units are adhered to the other layers, and the laminates thus formed are used in combination, so that a structure in which the positive electrodes, the solid electrolytes, and the negative electrodes are integrated with each other is obtained.

Japanese Unexamined Patent Application Publication No. 2007-273349 has disclosed a laminate type battery in which an end portion of a solid electrolyte layer is in contact with a first surface of a first current collector, and a first active material layer is covered with the solid electrolyte layer.

SUMMARY

In a related technique, it is desired to reduce the probability of contact between a positive electrode current collector and a negative electrode current collector.

In one general aspect, the techniques disclosed here feature a battery comprising: a positive electrode layer and a negative electrode layer; the positive electrode layer includes a positive electrode current collector, a positive electrode active material layer, and a positive electrode-side solid electrolyte layer; the positive electrode active material layer is in contact with the positive electrode current collector and is arranged in a region smaller than that thereof; the positive electrode-side solid electrolyte layer is in contact with the positive electrode current collector and the positive electrode active material layer and is arranged in the same region as that of the positive electrode current collector; the negative electrode layer includes a negative electrode current collector, a negative electrode active material layer, and a negative electrode-side solid electrolyte layer; the negative electrode active material layer is in contact with the negative electrode current collector and is arranged in a region smaller than that thereof; the negative electrode-side solid electrolyte layer is in contact with the negative electrode current collector and the negative electrode active material layer and is arranged in the same region as that of the negative electrode current collector; the positive electrode layer and the negative electrode layer are laminated to each other; the positive electrode active material layer faces the negative electrode active material layer with the positive electrode-side solid electrolyte layer and the negative electrode-side solid electrolyte layer provided therebetween; and the positive electrode-side solid electrolyte layer and the negative electrode-side solid electrolyte layer are bonded to each other.

According to the present disclosure, the probability of contact between the positive electrode current collector and the negative electrode current collector can be reduced.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Hereinafter, embodiments of the present disclosure will be described with reference to the drawings.

Embodiment 1

Figure 1:
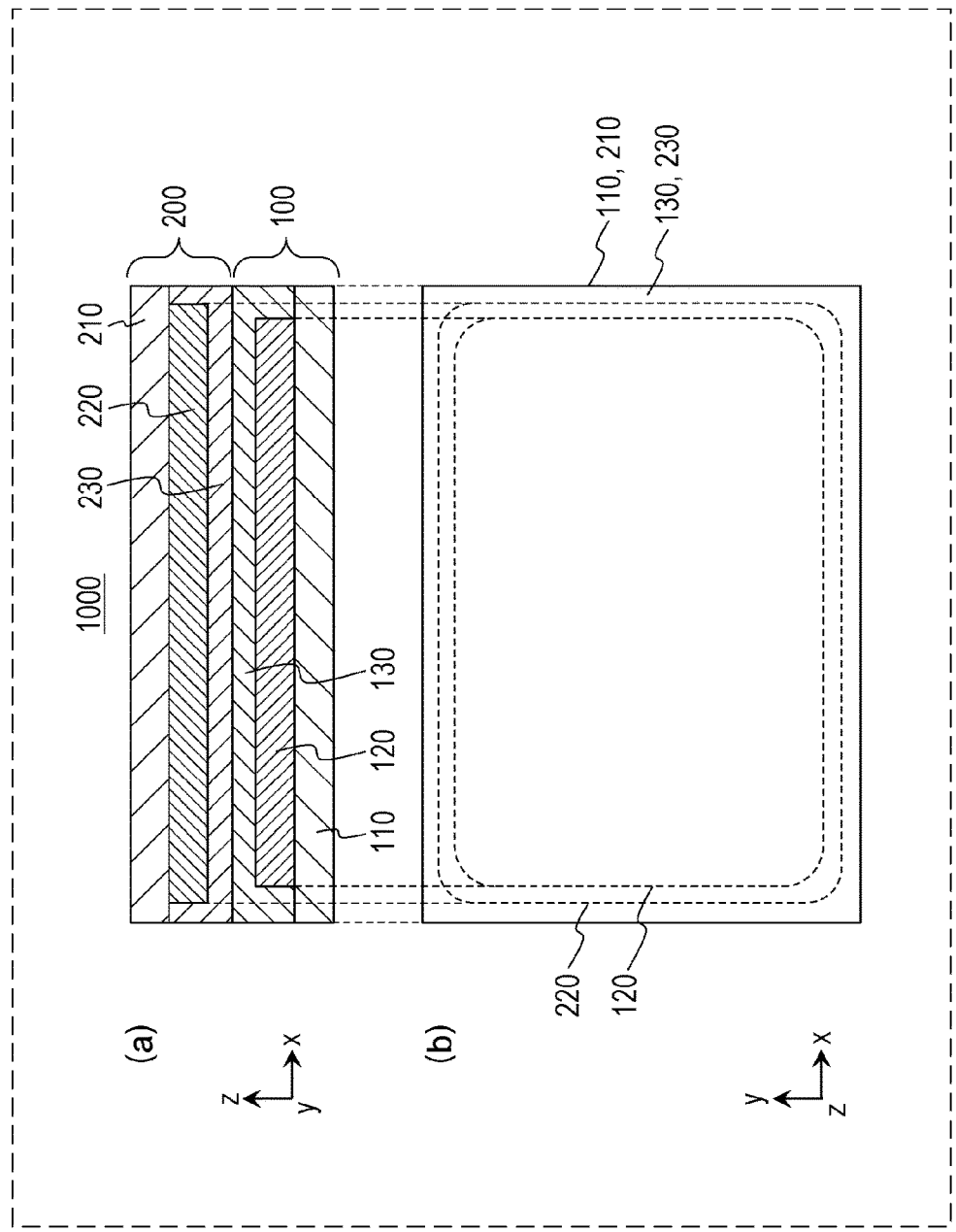
FIG. 1 is a view showing a schematic structure of a battery of Embodiment 1.

FIG. 1 is a view showing a schematic structure of a battery 1000 of Embodiment 1.

FIG. 1(a) is an x-z view (cross-sectional view) showing a schematic structure of the battery 1000 of Embodiment 1.

FIG. 1(b) is an x-y view (top perspective view) showing a schematic structure of the battery 1000 of Embodiment 1.

Figure 2:
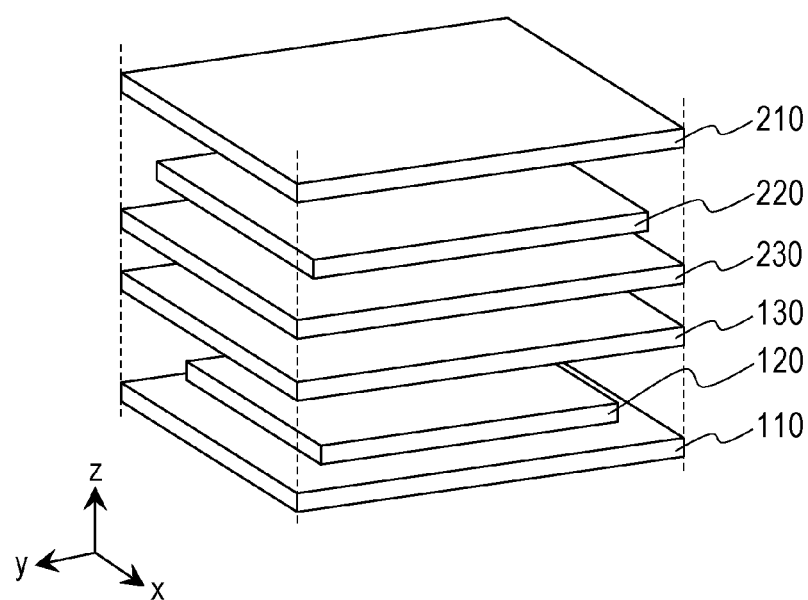
FIG. 2 is an exploded view (perspective view) showing a schematic structure of the battery of Embodiment 1.

FIG. 2 is an exploded view (perspective view) showing a schematic structure of the battery 1000 of Embodiment 1.

The battery 1000 of Embodiment 1 includes a positive electrode layer 100 and a negative electrode layer 200.

The positive electrode layer 100 includes a positive electrode current collector 110, a positive electrode active material layer 120, and a positive electrode-side solid electrolyte layer 130.

The positive electrode active material layer 120 is in contact with the positive electrode current collector 110 and is arranged in a region smaller than that thereof.

The positive electrode-side solid electrolyte layer 130 is in contact with the positive electrode current collector 110 and the positive electrode active material layer 120 and is arranged in the same region as that of the positive electrode current collector 110.

The negative electrode layer 200 includes a negative electrode current collector 210, a negative electrode active material layer 220, and a negative electrode-side solid electrolyte layer 230.

The negative electrode active material layer 220 is in contact with the negative electrode current collector 210 and is arranged in a region smaller than that thereof.

The negative electrode-side solid electrolyte layer 230 is in contact with the negative electrode current collector 210 and the negative electrode active material layer 220 and is arranged in the same region as that of the negative electrode current collector 210.

The positive electrode layer 100 and the negative electrode layer 200 are laminated to each other.

The positive electrode active material layer 120 faces the negative electrode active material layer 220 with the positive electrode-side solid electrolyte layer 130 and the negative electrode-side solid electrolyte layer 230 provided therebetween.

The positive electrode-side solid electrolyte layer 130 and the negative electrode-side solid electrolyte layer 230 are bonded to each other.

According to the structure described above, the probability of contact between the positive electrode current collector 110 and the negative electrode current collector 210 can be reduced. That is, a portion of the positive electrode current collector 110 and a portion of the negative electrode current collector 210 facing each other can be fixed by the positive electrode-side solid electrolyte layer 130 and the negative electrode-side solid electrolyte layer 230, respectively. For example, even if the positive electrode current collector 110 and the negative electrode current collector 210 are each formed of a thin film, the gap therebetween can be maintained at a predetermined distance (such as the total thickness of the positive electrode-side solid electrolyte layer 130 and the negative electrode-side solid electrolyte layer 230 or more) by the positive electrode-side solid electrolyte layer 130 and the negative electrode-side solid electrolyte layer 230. Hence, the positive electrode current collector 110 and the negative electrode current collector 210 are prevented from coming close to each other. As a result, for example, even when a plurality of battery cells are laminated to each other, the positive electrode current collector 110 and the negative electrode current collector 210 are prevented from being deformed. Accordingly, for example, even when a plurality of battery cells are laminated to each other, short circuit between the positive electrode current collector 110 and the negative electrode current collector 210 can be prevented. In addition, for example, even in the case of an all-solid battery in which no separators are provided between the positive electrode layer 100 and the negative electrode layer 200, the risk of short circuit caused by the direct contact between the positive electrode current collector 110 and the negative electrode current collector 210 can be reduced.

In addition, according to the structure described above, no additional members (such as an insulating spacer) insulating the positive electrode layer 100 from the negative electrode layer 200 are required. Hence, a battery manufacturing process can be more simplified, and the cost thereof can also be reduced.

Furthermore, by the structure described above, since a solid electrolyte layer formed of the positive electrode-side solid electrolyte layer 130 and the negative electrode-side solid electrolyte layer 230 bonded thereto is provided, for example, the probability of short circuit caused by pinholes to be generated in manufacturing, in the positive electrode-side solid electrolyte layer 130 and the negative electrode-side solid electrolyte layer 230 can be reduced.

Details of the above advantages will be described with reference to the following Comparative Examples 1 to 4.

Figure 20:
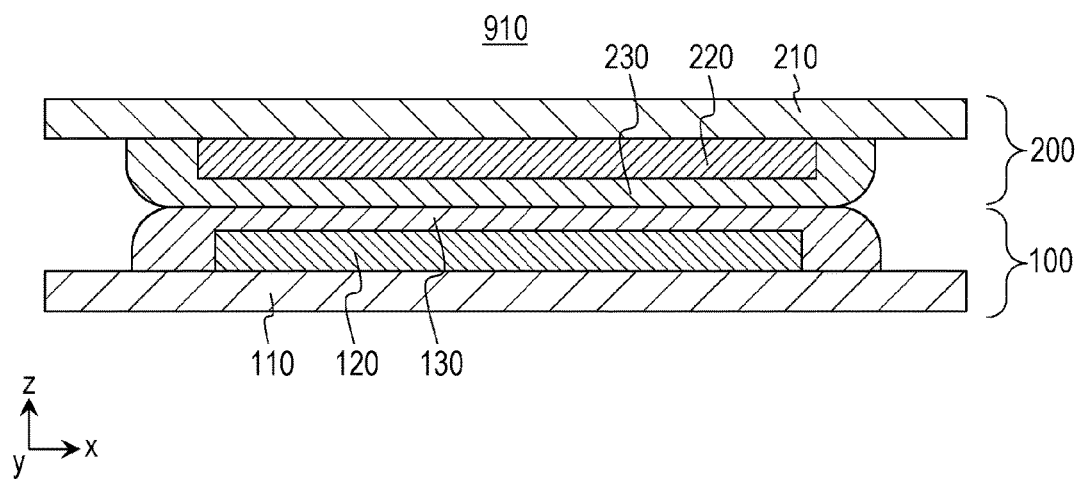
FIG. 20 is a cross-sectional view showing a schematic structure of a battery of Comparative Example 1.

FIG. 20 is a cross-sectional view showing a schematic structure of a battery 910 of Comparative Example 1.

In the battery 910 of Comparative Example 1, a positive electrode-side solid electrolyte layer 130 is arranged in a region smaller than that of a positive electrode current collector 110. That is, the positive electrode-side solid electrolyte layer 130 is not arranged in the same region as that of the positive electrode current collector 110.

In addition, in the battery 910 of Comparative Example 1, a negative electrode-side solid electrolyte layer 230 is arranged in a region smaller than that of a negative electrode current collector 210. That is, the negative electrode-side solid electrolyte layer 230 is not arranged in the same region as that of the negative electrode current collector 210.

That is, in the battery 910 of Comparative Example 1, the solid electrolyte layer is not formed to the end portion of the corresponding current collector. That is, the current collectors are each partially exposed. Hence, the gap between the positive electrode current collector 110 and the negative electrode current collector 210 becomes unstable at the end portion of each current collector. Hence, the positive electrode current collector 110 and the negative electrode current collector 210 are liable to come close to each other. As a result, the risk of direct contact between the exposed current collectors may arise. For example, when a plurality of battery cells are laminated to each other, the current collectors may be deformed and short-circuited to each other in some cases.

On the other hand, according to Embodiment 1, as described above, since the positive electrode-side solid electrolyte layer 130 and the negative electrode-side solid electrolyte layer 230 are each formed to the end portion of the corresponding current collector, the probability of contact between the positive electrode current collector 110 and the negative electrode current collector 210 can be reduced.

Figure 21:
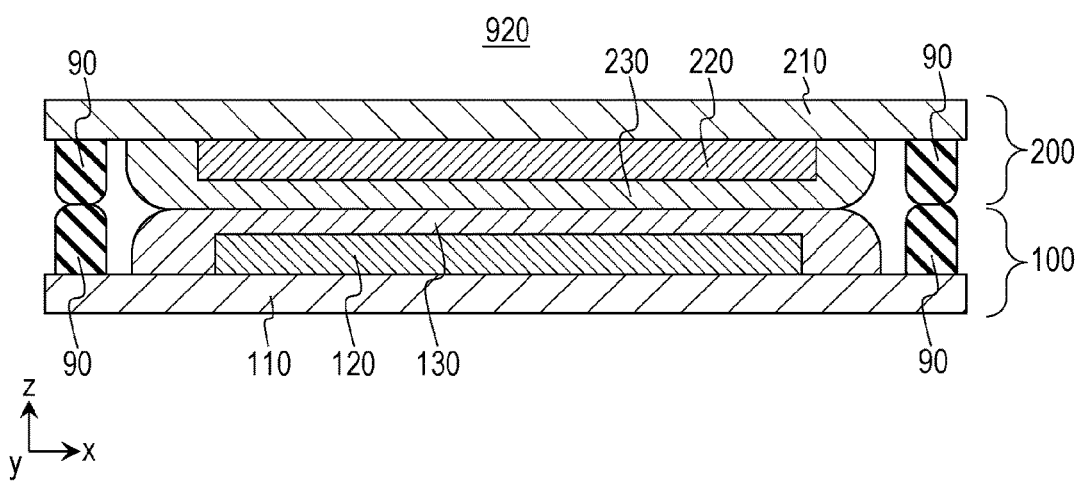
FIG. 21 is a cross-sectional view showing a schematic structure of a battery of Comparative Example 2.

FIG. 21 is a cross-sectional view showing a schematic structure of a battery 920 of Comparative Example 2.

The battery 920 of Comparative Example 2 includes insulating spacers 90 (for example, each formed of an insulating resin) besides the structure of the above battery 910 of Comparative Example 1. That is, the insulating spacers 90 are arranged between the positive electrode current collector 110 and the negative electrode current collector 210.

Since the insulating spacers 90 are provided, the short circuit caused by the contact between the positive electrode current collector 110 and the negative electrode current collector 210 can be prevented. However, in a manufacturing method of the battery 920 of Comparative Example 2, an additional step of preparing the insulating spacers 90 is required. Furthermore, a step of accurately positioning the insulating spacers 90 between the positive electrode current collector 110 and the negative electrode current collector 210 and a step of fixing the insulating spacers 90 are required. As described above, in Comparative Example 2, the battery manufacturing process is complicated, and the cost thereof is increased.

On the other hand, according to Embodiment 1, when steps of forming the positive electrode-side solid electrolyte layer 130 and the negative electrode-side solid electrolyte layer 230 to the end portions of the respective current collectors are performed, the complicated steps necessary when the insulating spacers 90 are used can be omitted. The steps of forming the positive electrode-side solid electrolyte layer 130 and the negative electrode-side solid electrolyte layer 230 to the end portions of the respective current collectors each can be easily added as one step of the process for forming the positive electrode-side solid electrolyte layer 130 or the negative electrode-side solid electrolyte layer 230. That is, compared to the case in which the insulating spacers 90 are used as described in Comparative Example 2, the battery manufacturing process can be more simplified, and the cost thereof can also be reduced.

Figure 22:
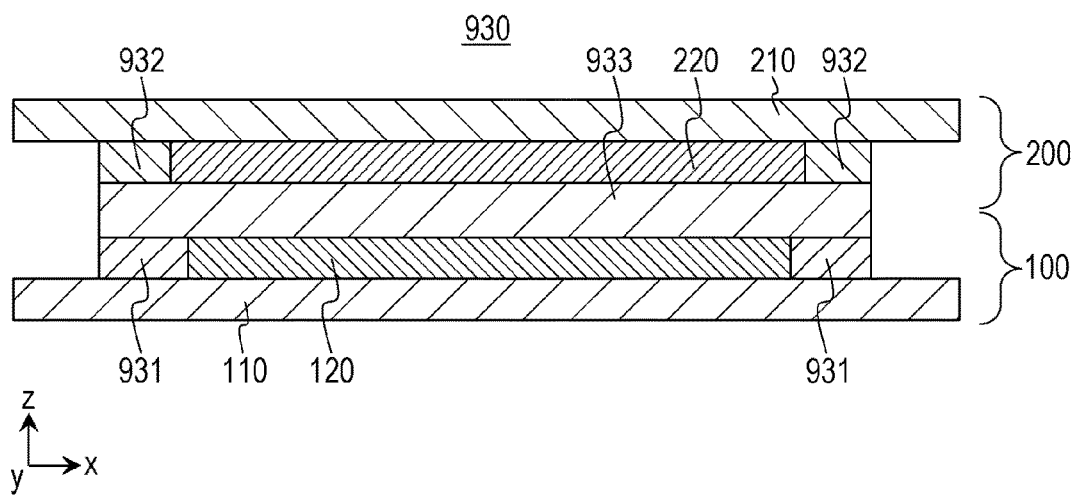
FIG. 22 is a cross-sectional view showing a schematic structure of a battery of Comparative Example 3.

FIG. 22 is a cross-sectional view showing a schematic structure of a battery 930 of Comparative Example 3.

In the battery 930 of Comparative Example 3, a solid electrolyte layer is a layer formed by adhesion and fusion bonding of solid electrolyte films (that is, a solid electrolyte layer 931, a solid electrolyte layer 932, and a solid electrolyte layer 933) having different dimensions, shapes, and the like. That is, in a region in which the positive electrode active material layer 120 faces the negative electrode active material layer 220, the solid electrolyte layer 933 is provided.

That is, in the battery 930 of Comparative Example 3, in the region in which the positive electrode active material layer 120 faces the negative electrode active material layer 220, a bond interface at which the positive electrode-side solid electrolyte layer 130 and the negative electrode-side solid electrolyte layer 230 are bonded to each other is not present. Hence, for example, the short circuit caused by pinholes generated in manufacturing, in the solid electrolyte layer 933 may occur in some cases.

On the other hand, according to Embodiment 1, as described above, in the region in which the positive electrode active material layer 120 faces the negative electrode active material layer 220, a bond interface at which the positive electrode-side solid electrolyte layer 130 and the negative electrode-side solid electrolyte layer 230 are bonded to each other can be provided. In this case, in the positive electrode-side solid electrolyte layer 130 and the negative electrode-side solid electrolyte layer 230, which are formed by different manufacturing steps, the positions of pinholes generated in the positive electrode-side solid electrolyte layer 130 do not coincide with the positions of pinholes generated in the negative electrode-side solid electrolyte layer 230. Hence, the pinholes generated in the positive electrode-side solid electrolyte layer 130 are blocked at the bond interface by the negative electrode-side solid electrolyte layer 230. In addition, the pinholes generated in the negative electrode-side solid electrolyte layer 230 are blocked at the bond interface by the positive electrode-side solid electrolyte layer 130. As a result, the probability of short circuit caused by pinholes to be generated in the solid electrolyte layer can be reduced.

Figure 23:
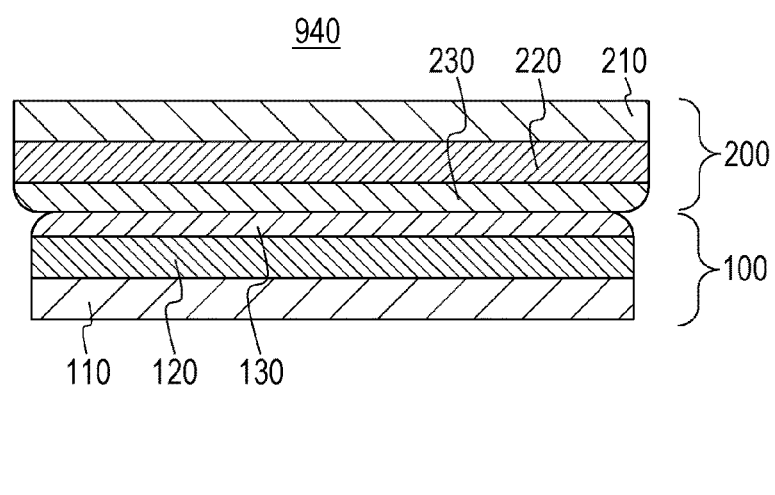
FIG. 23 is a cross-sectional view showing a schematic structure of a battery of Comparative Example 4.

FIG. 23 is a cross-sectional view showing a schematic structure of a battery 940 of Comparative Example 4.

In the battery 940 of Comparative Example 4, the positive electrode active material layer 120 is arranged in the same region as that of a positive electrode current collector 110. That is, the positive electrode active material layer 120 is not arranged in a region smaller than that of the positive electrode current collector 110. Hence, a positive electrode-side solid electrolyte layer 130 covers only the primary surface of the positive electrode active material layer 120 and does not cover the side surface (end portion) thereof.

In addition, in the battery 940 of Comparative Example 4, the negative electrode active material layer 220 is arranged in the same region as that of a negative electrode current collector 210. That is, the negative electrode active material layer 220 is not arranged in a region smaller than that of the negative electrode current collector 210. Hence, a negative electrode-side solid electrolyte layer 230 covers only the primary surface of the negative electrode active material layer 220 and does not cover the side surface (end portion) thereof.

That is, in the battery 940 of Comparative Example 4, the side surface (end portion) of the positive electrode active material layer 120 and the side surface (end portion) of the negative electrode active material layer 220 are exposed. Hence, a positive electrode active material which falls from the side surface (end portion) of the positive electrode active material layer 120 may be brought into contact with the negative electrode active material layer 220 or the negative electrode current collector 210 in some cases. In addition, a negative electrode active material which falls from the side surface (end portion) of the negative electrode active material layer 220 may be brought into contact with the positive electrode active material layer 120 or the positive electrode current collector 110 in some cases. Hence, the short circuit between the positive electrode layer and the negative electrode layer may occur in some cases. In addition, since the active material layer is formed in the same region as that of the current collector, the strength of the side surface (end portion) of the active material layer is decreased. As a result, in the battery 940 of Comparative Example 4, the active material is liable to fall from the side surface (end portion) of the active material layer.

On the other hand, according to Embodiment 1, as described above, the positive electrode active material 120 and the negative electrode active material layer 220 are arranged in the regions smaller than those of the positive electrode current collector 110 and the negative electrode current collector 210, respectively. Hence, by the positive electrode-side solid electrolyte layer 130 formed in the same region as that of the positive electrode current collector 110, the side surface (end portion) of the positive electrode active material layer 120 is covered, and as is the case described above, by the negative electrode-side solid electrolyte layer 230 formed in the same region as that of the negative electrode current collector 210, the side surface (end portion) of the negative electrode active material layer 220 is covered. Accordingly, the side surface (end portion) of the positive electrode active material layer 120 and the side surface (end portion) of the negative electrode active material layer 220 can be prevented from being exposed. As a result, the active material is prevented from falling from the side surface (end portion) of the active material layer. Accordingly, the probability of short circuit between the positive electrode layer and the negative electrode layer can be reduced. In addition, since the active material layer is formed in the region smaller than that of the current collector, the strength of the side surface (end portion) of the active material layer can be increased. As a result, according to Embodiment 1, the active material can be prevented from falling from the side surface (end portion) of the active material layer.

In addition, in the battery 1000 of Embodiment 1, as shown in FIG. 1, the negative electrode active material layer 220 may be arranged in a region larger than that of the positive electrode active material layer 120.

In this case, the positive electrode active material layer 120 may be arranged within a region in which the negative electrode active material layer 220 is formed.

According to the structure described above, precipitation of a metal (such as lithium) of the negative electrode active material layer 220 can be suppressed. Hence, the short circuit between the positive electrode layer 100 and the negative electrode layer 200 caused by the precipitation of a metal can be prevented.

For example, in the case of a lithium ion battery in which a carbon material or metal lithium is used as a negative electrode, when charge is performed, the potential at a negative electrode side decreases close to a potential at which lithium ions are precipitated as a metal. Hence, for example, when charge in a low-temperature environment or rapid charge is performed, a lithium ion occlusion rate of the negative electrode active material may not appropriately respond thereto in some cases. In this case, lithium ions may be precipitated as metal lithium in some cases. The precipitation of metal lithium is liable to occur particularly at an end portion at which current is concentrated. Hence, when the primary surface of the battery is perspectively viewed, the primary surface of the positive electrode active material layer 120 is formed to have a shape received in the primary surface of the negative electrode active material layer 220. As a result, the precipitation of metal lithium can be suppressed.

As the positive electrode current collector 110, a generally known positive electrode current collector may be used. The positive electrode current collector 110 may be formed, for example, of metal foil. As a material of the positive electrode current collector 110, for example, there may be used aluminum, copper, stainless steel, nickel, platinum, gold, or an alloy containing at least one of the metals mentioned above.

The positive electrode active material layer 120 is a layer containing a positive electrode active material.

As the positive electrode active material, a generally known positive electrode active material may be used. When the battery 1000 of Embodiment 1 is formed as a lithium ion secondary battery (storage battery), the positive electrode active material may be a compound capable of occluding and releasing Li. For example, as the positive electrode active material, a compound containing lithium may be used. For example, as the positive electrode active material, $LiCoO_2$, $LiNiO_2$, $LiMn_2O_4$, $LiCoPO_4$, $LiMnPO_4$, $LiFePO_4$, $LiNiPO_4$, or a compound (such as $LiNi_{1/3}Co_{1/3}Mn_{1/3}O_2$, $LiNi_{0.8}Co_{0.15}Al_{0.05}O_2$, or $LiNi_{0.5}Mn_{1.5}O_2$) obtained by substituting the transition metal of one of the above compounds by one or two foreign elements may be used.

In addition, the positive electrode active material layer 120 may be a positive electrode mixture layer containing a positive electrode active material and another material. That is, the positive electrode active material layer 120 may also be a layer containing a mixture of a positive electrode active material and a solid electrolyte. Alternatively, the positive electrode active material layer 120 may also contain, for example, an electrically conductive auxiliary agent or a binder together with a positive electrode active material and a solid electrolyte.

In addition, the positive electrode active material layer 120 may be formed of a plurality of layers. For example, the positive electrode active material layer 120 may include a first layer at a side in contact with the positive electrode current collector 110. In this case, the positive electrode active material layer 120 may also include a second layer at a side in contact with the positive electrode-side solid electrolyte layer 130. In this case, the first layer and the second layer may be layers having compositions (shape, thickness, contained material, and the like) different from each other.

The positive electrode-side solid electrolyte layer 130 is a layer containing a positive electrode-side solid electrolyte.

As the positive electrode-side solid electrolyte, a generally known solid electrolyte may be used. When the battery 1000 of Embodiment 1 is formed as a lithium ion secondary battery (storage battery), the solid electrolyte may be a compound containing lithium. For example, as the solid electrolyte, there may be used $Li_3Zr_2Si_2PO_{12}$, $Li_7La_3Zr_2O_{12}$, $Li_5La_3Ta_2O_{12}$, $Li_{i+x}Al_xTi_{2-x}(PO_4)_3$, $Li_{1.5}Ti_{1.7}Al_{0.8}P_{2.8}Si_{0.2}O_{12}$, $La_{2/3-x}Li_{3x}TiO_3$, $Li_2S$—$SiS_2$-based glass and glass ceramic, $Li_2S$—$B_2S_3$-based glass and glass ceramic, $Li_2S$—$P_2S_5$-based glass and glass ceramic, $Li_{3.25}Ge_{0.25}P_{0.75}S_4$, or $Li_{10}GeP_2S_{12}$. In addition, as the solid electrolyte, a compound formed, for example, by adding LiI or $Li_xMO_y$ (M: P, Si, Ge, B, Al, Ga or In, x and y: natural number) to one of the compounds mentioned above may be used. As the solid electrolyte, an inorganic-based solid electrolyte (sulfide-based solid electrolyte or an oxide-based solid electrolyte) or a high molecular weight solid electrolyte (for example, formed by dissolving a lithium salt in a poly(ethylene oxide) may be used.

For the positive electrode-side solid electrolyte layer 130, a polymer electrolyte or a mixture of an inorganic solid electrolyte and a binder may be used. A solid electrolyte material and a binder material used for the positive electrode-side solid electrolyte layer 130 may be the same as those used for the positive electrode active material layer 120, respectively.

As the negative electrode current collector 210, a generally known negative electrode current collector may be used. The negative electrode current collector 210 may be formed, for example, of metal foil. As the negative electrode current collector 210, for example, aluminum, copper, stainless steel, nickel, platinum, gold, or an alloy containing at least one of those mentioned above may be used.

The negative electrode active material layer 220 is a layer containing a negative electrode active material.

As the negative electrode active material, a generally known negative electrode active material may be used.

When the battery 1000 of Embodiment 1 is formed as a lithium ion secondary battery (storage battery), the negative electrode active material may be a compound capable of occluding and releasing Li. For example, as the negative electrode active material, a metal compound or a carbon material may be used. For example, as the negative electrode active material, metal indium, metal lithium, a carbon material (such as graphite or hard carbon), $Li_4Ti_5O_{12}$, Si, SiO, Sn, or SnO may be used.

In addition, the negative electrode active material layer 220 may be a negative electrode mixture layer containing a negative electrode active material and another material. That is, the negative electrode active material layer 220 may be a layer containing a mixture of a negative electrode active material and a solid electrolyte. Alternatively, the negative electrode active material layer 220 may contain an electrically conductive auxiliary agent or a binder besides a negative electrode active material and a solid electrolyte. In addition, when the negative electrode active material layer 220 is formed of foil of a metal capable of forming an alloy with lithium, for example, the solid electrolyte may not be contained. The negative electrode-side solid electrolyte layer 230 is a layer containing a negative electrode-side solid electrolyte.

In addition, the negative electrode active material layer 220 may be formed of a plurality of layers. For example, the negative electrode active material layer 220 may include a first layer at a side in contact with the negative electrode current collector 210. In this case, the negative electrode active material layer 220 may also include a second layer at a side in contact with the negative electrode-side solid electrolyte layer 230. In this case, the first layer and the second layer may be layers having compositions (shape, thickness, contained material, and the like) different from each other.

As the negative electrode-side solid electrolyte, a generally known solid electrolyte may be used. As the negative electrode-side solid electrolyte, the above material usable as the positive electrode-side solid electrolyte may be used.

For the negative electrode-side solid electrolyte layer 230, a polymer electrolyte or a mixture of an inorganic solid electrolyte and a binder may be used. The solid electrolyte material and the binder material used for the negative electrode-side solid electrolyte layer 230 may be the same as those used for the negative electrode active material layer 220, respectively.

As the electrically conductive auxiliary agent, for example, a carbon material (such as acetylene black, ketjen black, or carbon nanotubes) or a metal powder may be used.

As the binder, a generally known high molecular weight compound may be used. For example, as the binder, a poly(vinylidene fluoride) (PVDF), a poly(vinylidene fluoride-hexafluoropropylene) (PVDF-HFP), a rubber-based resin, an elastomer may be used.

In addition, in the battery 1000 of Embodiment 1, the positive electrode-side solid electrolyte layer 130 and the negative electrode-side solid electrolyte layer 230 may contain the same solid electrolyte or different solid electrolytes.

In addition, in the battery 1000 of Embodiment 1, the positive electrode-side solid electrolyte layer 130 and the negative electrode-side solid electrolyte layer 230 may contain the solid electrolytes in the same amount (concentration) or different amounts (concentrations).

In addition, in the battery 1000 of Embodiment 1, the thickness of the positive electrode-side solid electrolyte layer 130 may be the same as or different form that of the negative electrode-side solid electrolyte layer 230.

In addition, as shown in FIG. 1, the entire negative electrode current collector 210 may be arranged in parallel to the entire positive electrode current collector 110. That is, the distance between the positive electrode current collector 110 and the negative electrode current collector 210 may be constant in the entire film formation region. Alternatively, the negative electrode current collector 210 may be arranged partially in parallel to the positive electrode current collector 110.

In addition, in the battery 1000 of Embodiment 1, as shown in FIG. 1, the entire primary surface of the positive electrode-side solid electrolyte layer 130 and the entire primary surface of the negative electrode-side solid electrolyte layer 230 may be bonded to each other. Alternatively, a part (such as at least a half) of the primary surface of the positive electrode-side solid electrolyte layer 130 may be bonded to a part (such as at least a half) of the primary surface of the negative electrode-side solid electrolyte layer 230.

The battery 1000 of Embodiment 1 may be, for example, an all-solid battery (such as an all-solid lithium secondary battery). According to the battery 1000 of Embodiment 1, an all-solid battery capable of suppressing the short circuit between the positive electrode and the negative electrode in manufacturing and charging can be realized. In addition, even if a high voltage (such as a voltage corresponding to that of at least two battery cells) is required, when a laminate type all-solid battery using a solid electrolyte is used, an increase in voltage can be easily achieved by connecting power generation elements in series in one battery cell. According to the battery 1000 of Embodiment 1, even if a plurality of cells are laminated to each other, a laminate type all-solid battery in which the positive electrode is not short-circuited to the negative electrode can be realized.

A method for manufacturing the battery 1000 of Embodiment 1 will be described in the following Embodiment 2 and Embodiment 3.

Embodiment 2

Hereinafter, Embodiment 2 will be described. Description duplicated with that of the above Embodiment 1 will be appropriately omitted.

Figure 3:
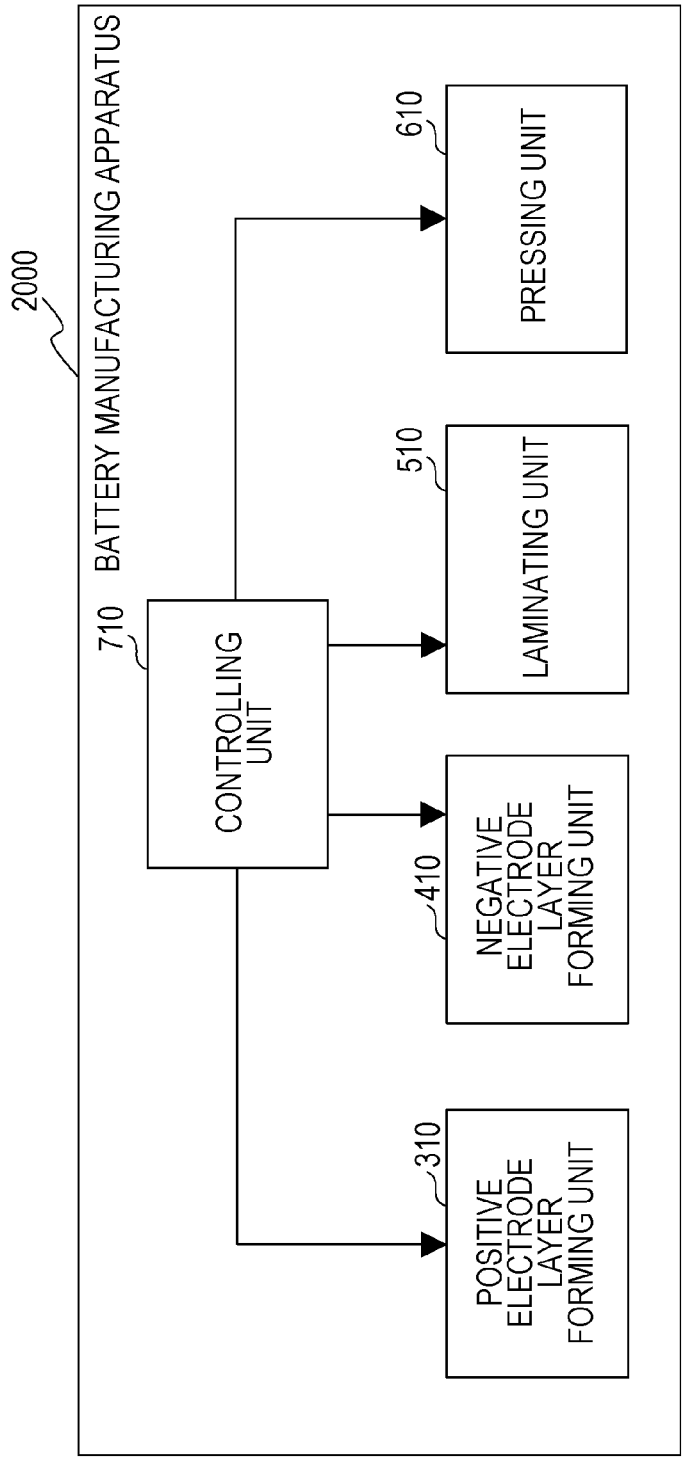
FIG. 3 is a view showing a schematic structure of a battery manufacturing apparatus of Embodiment 2.

FIG. 3 is a view showing a schematic structure of a battery manufacturing apparatus 2000 of Embodiment 2.

The battery manufacturing apparatus 2000 of Embodiment 2 includes a positive electrode layer forming unit 310 (e.g., positive electrode layer former), a negative electrode layer forming unit 410 (e.g., negative electrode layer former), and a laminating unit 510 (e.g., laminator).

The positive electrode layer forming unit 310 forms the positive electrode layer 100.

The positive electrode layer forming unit 310 forms the positive electrode active material layer 120 in a region smaller than that the positive electrode current collector 110 so as to be in contact therewith.

The positive electrode layer forming unit 310 forms the positive electrode-side solid electrolyte layer 130 in the same region as that of the positive electrode current collector 110 so as to be in contact with the positive electrode current collector 110 and the positive electrode active material layer 120.

The negative electrode layer forming unit 410 forms the negative electrode layer 200.

The negative electrode layer forming unit 410 forms the negative electrode active material layer 220 in a region smaller than that the negative electrode current collector 210 so as to be in contact therewith.

The negative electrode layer forming unit 410 forms the negative electrode-side solid electrolyte layer 230 in the same region as that of the negative electrode current collector 210 so as to be in contact with the negative electrode current collector 210 and the negative electrode active material layer 220.

The laminating unit 510 laminates the positive electrode layer 100 and the negative electrode layer 200 to each other. Accordingly, the laminating unit 510 enables the positive electrode active material layer 120 to face the negative electrode active material layer 220 with (e.g., via) the positive electrode-side solid electrolyte layer 130 and the negative electrode-side solid electrolyte layer 230 provided therebetween.

Figure 4:
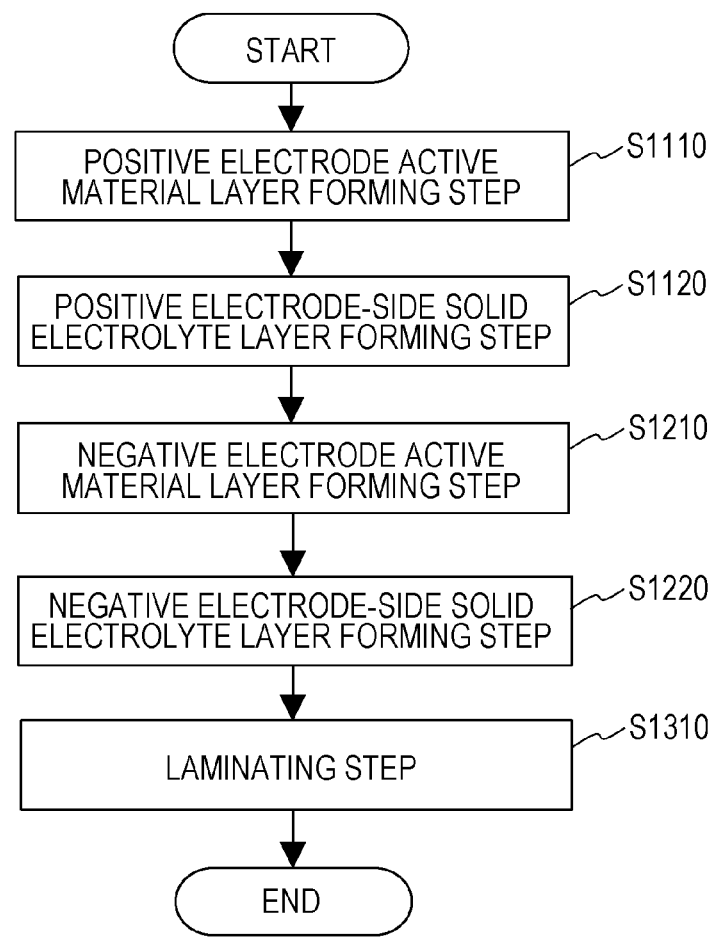
FIG. 4 is a flowchart showing a battery manufacturing method of Embodiment 2.

FIG. 4 is a flowchart showing a battery manufacturing method of Embodiment 2.

The battery manufacturing method of Embodiment 2 is a battery manufacturing method using the battery manufacturing apparatus 2000 of Embodiment 2. For example, the battery manufacturing method of Embodiment 2 is a battery manufacturing method to be carried out by the battery manufacturing apparatus 2000 of Embodiment 2.

The battery manufacturing method of Embodiment 2 includes a positive electrode active material layer forming step S1110 (Step (a1)), a positive electrode-side solid electrolyte layer forming step S1120 (Step (a2)), a negative electrode active material layer forming step S1210 (Step (b1)), a negative electrode-side solid electrolyte layer forming step S1220 (Step (b2)), and a laminating step S1310 (Step (c)).

The positive electrode active material layer forming step S1110 is a step of forming, by the positive electrode layer forming unit 310, the positive electrode active material layer 120 in a region smaller than that of the positive electrode current collector 110 so as to be in contact therewith.

The positive electrode-side solid electrolyte layer forming step S1120 is a step of forming, by the positive electrode layer forming unit 310, the positive electrode-side solid electrolyte layer 130 in the same region as that of the positive electrode current collector 110 so as to be in contact with the positive electrode current collector 110 and the positive electrode active material layer 120. The positive electrode-side solid electrolyte layer forming step S1120 is a step to be carried out after the positive electrode active material layer forming step S1110 is performed.

The negative electrode active material layer forming step S1210 is a step of forming, by the negative electrode layer forming unit 410, the negative electrode active material layer 220 in a region smaller than that of the negative electrode current collector 210 so as to be in contact therewith.

The negative electrode-side solid electrolyte layer forming step S1220 is a step of forming, by the negative electrode layer forming unit 410, the negative electrode-side solid electrolyte layer 230 in the same region as that of the negative electrode current collector 210 so as to be in contact with the negative electrode current collector 210 and the negative electrode active material layer 220. The negative electrode-side solid electrolyte layer forming step S1220 is a step to be carried out after the negative electrode active material layer forming step S1210 is performed.

The laminating step S1310 is a step of laminating, by the laminating unit 510, the positive electrode layer 100 and the negative electrode layer 200 to each other so that the positive electrode active material layer 120 faces the negative electrode active material layer 220 with (e.g., via) the positive electrode-side solid electrolyte layer 130 and the negative electrode-side solid electrolyte layer 230 provided therebetween. The laminating step S1310 is a step to be carried out after the positive electrode-side solid electrolyte layer forming step S1120 and the negative electrode-side solid electrolyte layer forming step S1220 are performed.

According to the manufacturing apparatus or the manufacturing method described above, the battery 1000 of Embodiment 1 can be manufactured.

According to the manufacturing apparatus or the manufacturing method described above, after the positive electrode-side solid electrolyte layer 130 is formed in the same region as that of the positive electrode current collector 110, and the negative electrode-side solid electrolyte layer 230 is formed in the same region as that of the negative electrode current collector 210, since the positive electrode layer 100 and the negative electrode layer 200 are laminated to each other, even in the battery manufacturing, the stability of the positions of the positive electrode current collector 110 and the negative electrode current collector 210 is more enhanced, and the probability of contact between the positive electrode current collector 110 and the negative electrode current collector 210 can be more reduced.

Furthermore, according to the manufacturing apparatus or the manufacturing method described above, the probability of contact between the positive electrode current collector 110 and the negative electrode current collector 210 can be reduced. That is, the portion of the positive electrode current collector 110 and the portion of the negative electrode current collector 210 facing each other can be fixed by the positive electrode-side solid electrolyte layer 130 and the negative electrode-side solid electrolyte layer 230, respectively. For example, even if the positive electrode current collector 110 and the negative electrode current collector 210 are each formed of a thin film, by the positive electrode-side solid electrolyte layer 130 and the negative electrode-side solid electrolyte layer 230, the gap between the positive electrode current collector 110 and the negative electrode current collector 210 can be maintained at a predetermined distance (such as the total thickness of the positive electrode-side solid electrolyte layer 130 and the negative electrode-side solid electrolyte layer 230 or more). Hence, the positive electrode current collector 110 and the negative electrode current collector 210 are prevented from coming close to each other. Accordingly, for example, even if a plurality of battery cells are laminated to each other, the positive electrode current collector 110 and the negative electrode current collector 210 can be prevented from being deformed. Hence, for example, even if a plurality of battery cells are laminated to each other, the short circuit between the positive electrode current collector 110 and the negative electrode current collector 210 can be prevented. In addition, for example, even in the case of an all-solid battery in which no separators are provided between the positive electrode layer 100 and the negative electrode layer 200, the risk of short circuit caused by the direct contact between the positive electrode current collector 110 and the negative electrode current collector 210 can be reduced.

Furthermore, according to the manufacturing apparatus or the manufacturing method described above, no additional members (such as insulating spacers) insulating the positive electrode layer 100 and the negative electrode layer 200 are not necessary. As a result, the battery manufacturing process can be more simplified, and the cost thereof can also be reduced.

Furthermore, according to the manufacturing apparatus or the manufacturing method described above, since the solid electrolyte layer obtained by bonding the positive electrode-side solid electrolyte layer 130 to the negative electrode-side solid electrolyte layer 230 is provided, for example, the probability of short circuit caused by pinholes to be generated in manufacturing, in the positive electrode-side solid electrolyte layer 130 and the negative electrode-side solid electrolyte layer 230 can be reduced.

In addition, in the battery manufacturing apparatus 2000 of Embodiment 2, the negative electrode layer forming unit 410 may form the negative electrode active material layer 220 in a region larger than that of the positive electrode active material layer 120. In this case, the laminating unit 510 may arrange the positive electrode active material layer 120 within the region in which the negative electrode active material layer 220 is formed.

In other words, in the negative electrode active material layer forming step S1210 of the battery manufacturing method of Embodiment 2, the negative electrode active material layer 220 may be formed in a region larger than that of the positive electrode active material layer 120 by the negative electrode layer forming unit 410.

In this case, in the laminating step S1310, by the laminating unit 510, the positive electrode active material layer 120 may be arranged within the region in which the negative electrode active material layer 220 is formed.

According to the manufacturing apparatus or the manufacturing method described above, precipitation of a metal (such as lithium) at the negative electrode active material layer 220 can be suppressed. Hence, the short circuit between the positive electrode layer 100 and the negative electrode layer 200 caused by the metal precipitation can be prevented.

In addition, in Embodiment 2, as shown in FIG. 4, the negative electrode active material layer forming step S1210 and the negative electrode-side solid electrolyte layer forming step S1220 may be carried out after the positive electrode active material layer forming step S1110 and the positive electrode-side solid electrolyte layer forming step S1120 are performed.

Alternatively, the negative electrode active material layer forming step S1210 and the negative electrode-side solid electrolyte layer forming step S1220 may be carried out before the positive electrode active material layer forming step S1110 and the positive electrode-side solid electrolyte layer forming step S1120 are performed.

Alternatively, the negative electrode active material layer forming step S1210 and the negative electrode-side solid electrolyte layer forming step S1220 may be carried out simultaneously in parallel with the positive electrode active material layer forming step S1110 and the positive electrode-side solid electrolyte layer forming step S1120.

Hereinafter, a concrete example of the battery manufacturing method of Embodiment 2 will be described.

Figure 5:
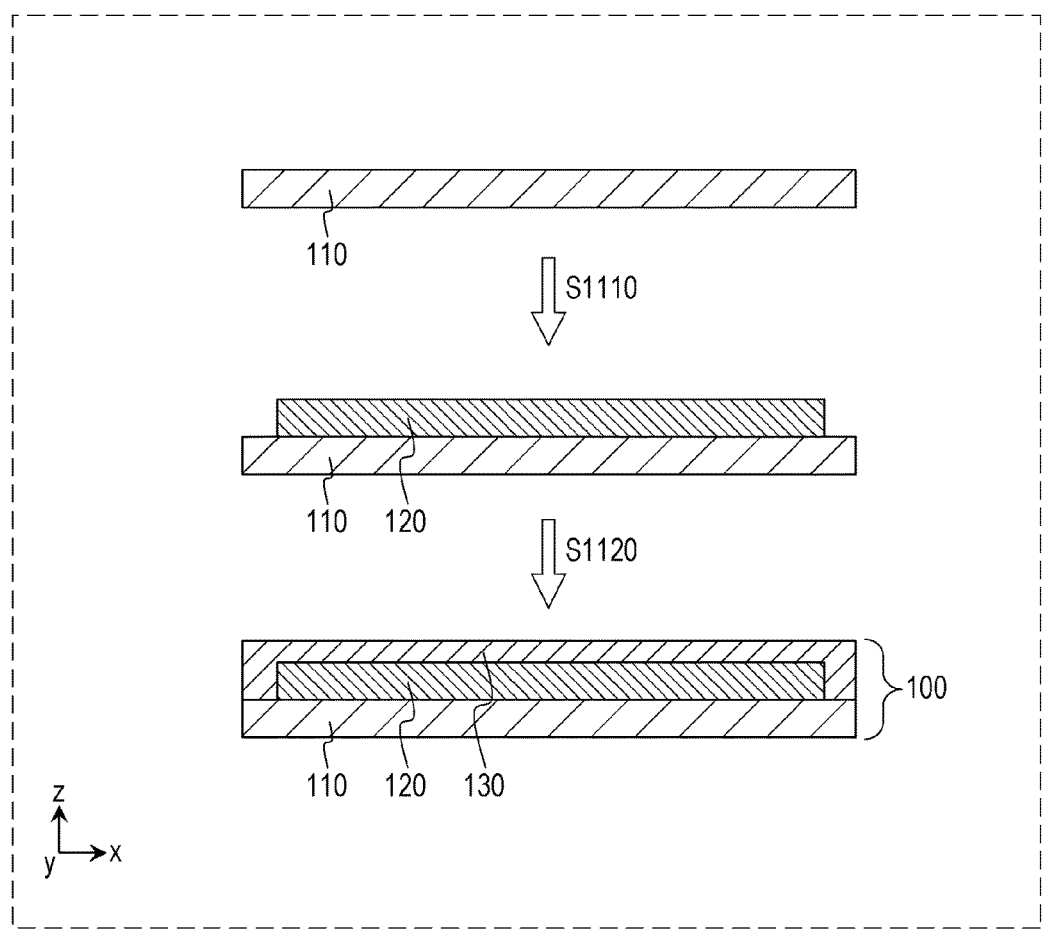
FIG. 5 is a view showing one example of a positive electrode active material layer forming step S1110 and a positive electrode-side solid electrolyte layer forming step S1120.

FIG. 5 is a view showing one example of the positive electrode active material layer forming step S1110 and the positive electrode-side solid electrolyte layer forming step S1120.

On the positive electrode current collector 110 prepared in advance, the positive electrode active material layer 120 is formed. For example, a paint in the form of paste in which a positive electrode active material (and other materials) is kneaded together with a predetermined solvent is applied on the positive electrode current collector 110 by a coating device or the like (and then may be dried). In this case, the positive electrode active material layer 120 is formed in a region smaller than that of the positive electrode current collector 110 so as to be in contact therewith (positive electrode active material layer forming step S1110). As a result, on the positive electrode current collector 110, the positive electrode active material layer 120 is formed so that the periphery of the positive electrode current collector 110 is exposed.

On the positive electrode current collector 110 on which the positive electrode active material layer 120 is formed, the positive electrode-side solid electrolyte layer 130 is formed. For example, a paint in the form of paste in which a positive electrode-side solid electrolyte (and other materials) is kneaded together with a predetermined solvent is applied on the positive electrode active material layer 120 and the positive electrode current collector 110 by a coating device or the like (and then may be dried). In this case, the positive electrode-side solid electrolyte layer 130 is formed in the same region as that of the positive electrode current collector 110 (positive electrode-side solid electrolyte layer forming step S1120). As a result, on the exposed positive electrode current collector 110, the positive electrode-side solid electrolyte layer 130 is formed so as to cover the positive electrode active material layer 120. Accordingly, the positive electrode layer 100 (such as a positive electrode plate) is formed.

Figure 6:
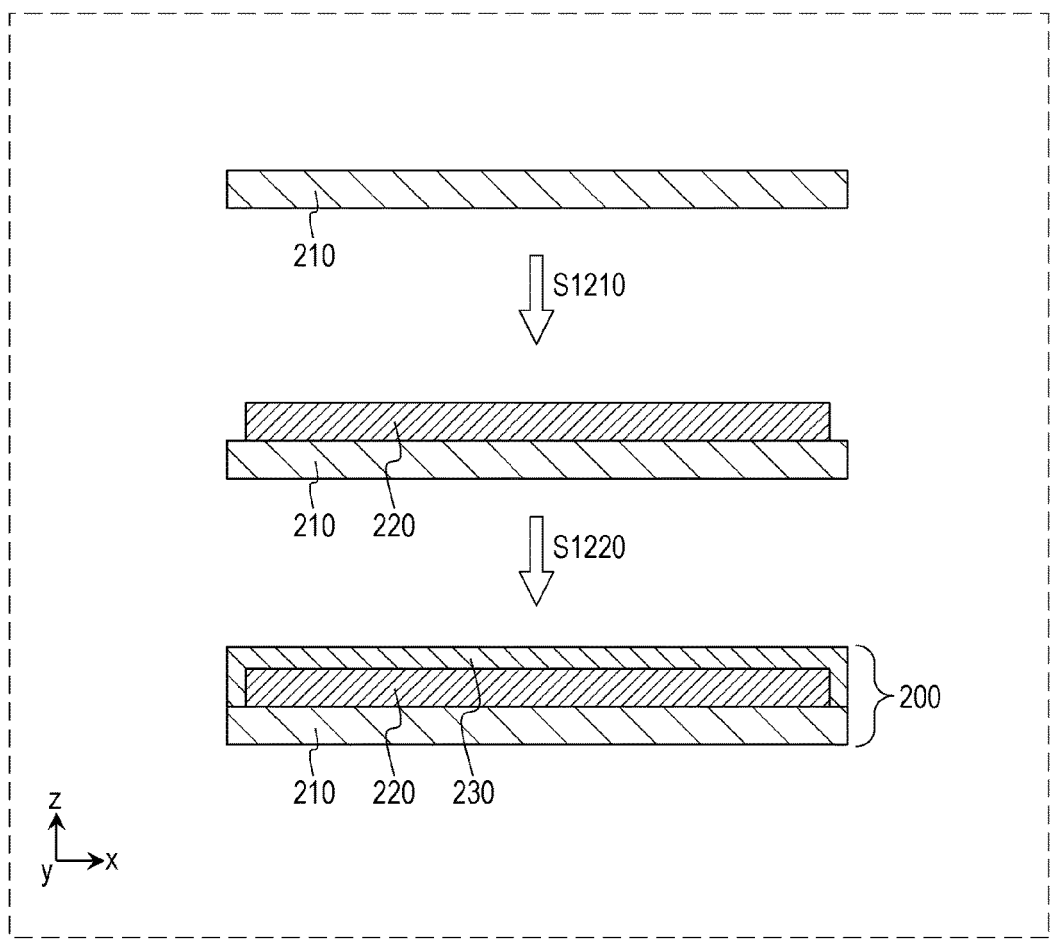
FIG. 6 is a view showing one example of a negative electrode active material layer forming step S1210 and a negative electrode-side solid electrolyte layer forming step S1220.

FIG. 6 is a view showing one example of the negative electrode active material layer forming step S1210 and the negative electrode-side solid electrolyte layer forming step S1220.

On the negative electrode current collector 210 prepared in advance, the negative electrode active material layer 220 is formed. For example, a paint in the form of paste in which a negative electrode active material (and other materials) is kneaded together with a predetermined solvent is applied on the negative electrode current collector 210 by a coating device or the like (and then may be dried). In this case, the negative electrode active material layer 220 is formed in a region smaller than that of the negative electrode current collector 210 so as to be in contact therewith (negative electrode active material layer forming step S1210). As a result, on the negative electrode current collector 210, the negative electrode active material layer 220 is formed so that the periphery of the negative electrode current collector 210 is exposed. In addition, in the example shown in FIG. 6, the negative electrode active material layer 220 is formed in a region larger than that of the positive electrode active material layer 120 (that is, in a region larger than the region in which the positive electrode active material layer 120 is formed).

On the negative electrode current collector 210 on which the negative electrode active material layer 220 is formed, the negative electrode-side solid electrolyte layer 230 is formed. For example, a paint in the form of paste in which a negative electrode-side solid electrolyte (and other materials) is kneaded together with a predetermined solvent is applied on the negative electrode active material layer 220 and the negative electrode current collector 210 by a coating device or the like (and then may be dried). In this case, the negative electrode-side solid electrolyte layer 230 is formed in the same region as that of the negative electrode current collector 210 (negative electrode-side solid electrolyte layer forming step S1220). As a result, on the exposed negative electrode current collector 210, the negative electrode-side solid electrolyte layer 230 is formed so as to cover the negative electrode active material layer 220. Accordingly, the negative electrode layer 200 (such as a negative electrode plate) is formed.

Figure 7:
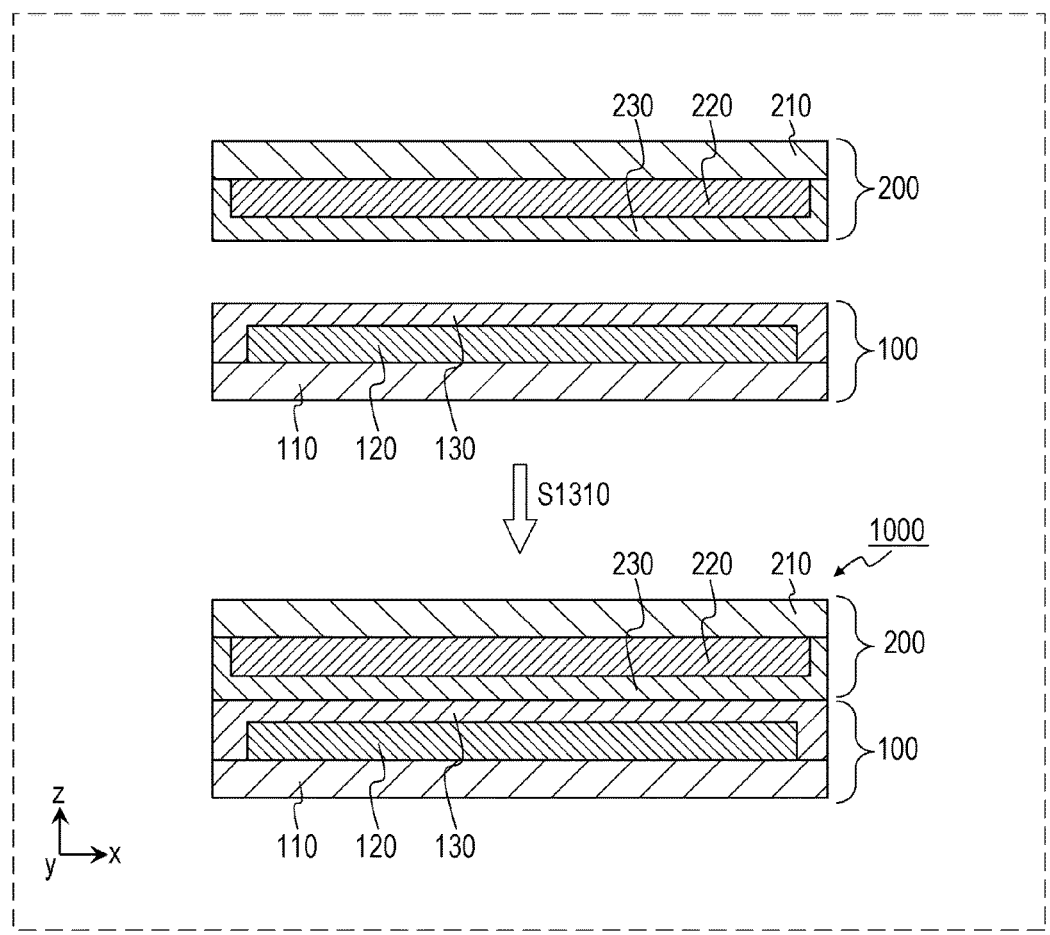
FIG. 7 is a view showing one example of a laminating step S1310.

FIG. 7 is a view showing one example of the laminating step S1310.

The positive electrode layer 100 and the negative electrode layer 200 formed as described above are positioned using a transporting device so as to face each other. Subsequently, the positive electrode layer 100 and the negative electrode layer 200 are brought into contact with each other for lamination. As a result, the positive electrode active material layer 120 faces the negative electrode active material layer 220 with the positive electrode-side solid electrolyte layer 130 and the negative electrode-side solid electrolyte layer 230 provided therebetween (laminating step S1310).

The portion of the positive electrode-side solid electrolyte layer 130 and the portion of the negative electrode-side solid electrolyte layer 230 in contact therewith may be bonded to each other by a drying step or a pressure-bonding step. As a result, the battery 1000 of Embodiment 1 is formed.

In addition, in the laminating step S1310, the entire primary surface of the positive electrode-side solid electrolyte layer 130 and the entire primary surface of the negative electrode-side solid electrolyte layer 230 may be in contact with each other (and then may be bonded to each other). Alternatively, a part (such as a half or more) of the primary surface of the positive electrode-side solid electrolyte layer 130 and a part (such as a half or more) of the primary surface of the negative electrode-side solid electrolyte layer 230 may be in contact with each other (and then may be bonded to each other).

Figure 8:
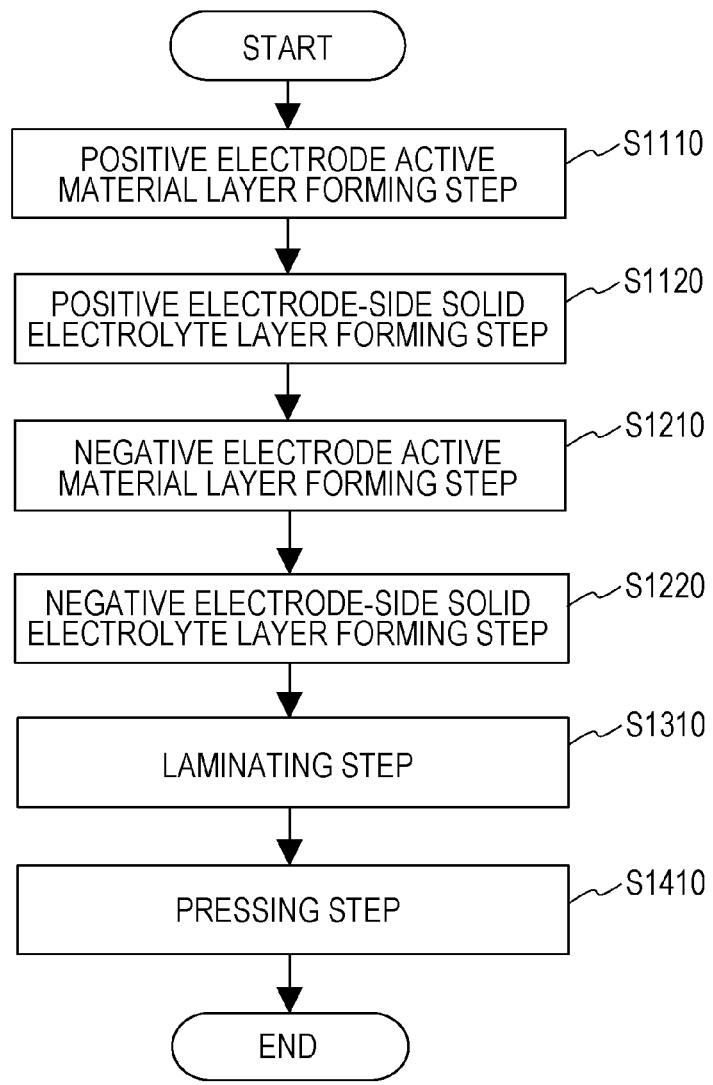
FIG. 8 is a flowchart showing a modified example of the battery manufacturing method of Embodiment 2.

FIG. 8 is a flowchart showing a modified example of the battery manufacturing method of Embodiment 2.

In Embodiment 2, as shown in FIG. 3, the battery manufacturing apparatus 2000 may further include a pressing unit 610 (e.g., pressor).

The pressing unit 610 bonds the positive electrode-side solid electrolyte layer 130 to the negative electrode-side solid electrolyte layer 230 by pressing the positive electrode layer 100 and the negative electrode layer 200 laminated thereto.

In other words, as shown in FIG. 8, the battery manufacturing method of Embodiment 2 may further include a pressing step S1410 (Step (d)). In addition, the pressing step S1410 may be carried out after the laminating step S1310 is performed.

The pressing step S1410 is a step of pressing, by the pressing unit 610, the positive electrode layer 100 and the negative electrode layer 200 laminated thereto, resulting in the positive electrode-side solid electrolyte layer 130 is bonded (pressure-bonded) to the negative electrode-side solid electrolyte layer 230.

According to the manufacturing apparatus or the manufacturing method described above, since the positive electrode-side solid electrolyte layer 130 and the negative electrode-side solid electrolyte layer 230 are pressure-bonded to each other, the bond therebetween can be more enhanced. In addition, the probability of short circuit caused by pinholes to be generated in the positive electrode-side solid electrolyte layer 130 and the negative electrode-side solid electrolyte layer 230 can be more reduced.

Figure 9:
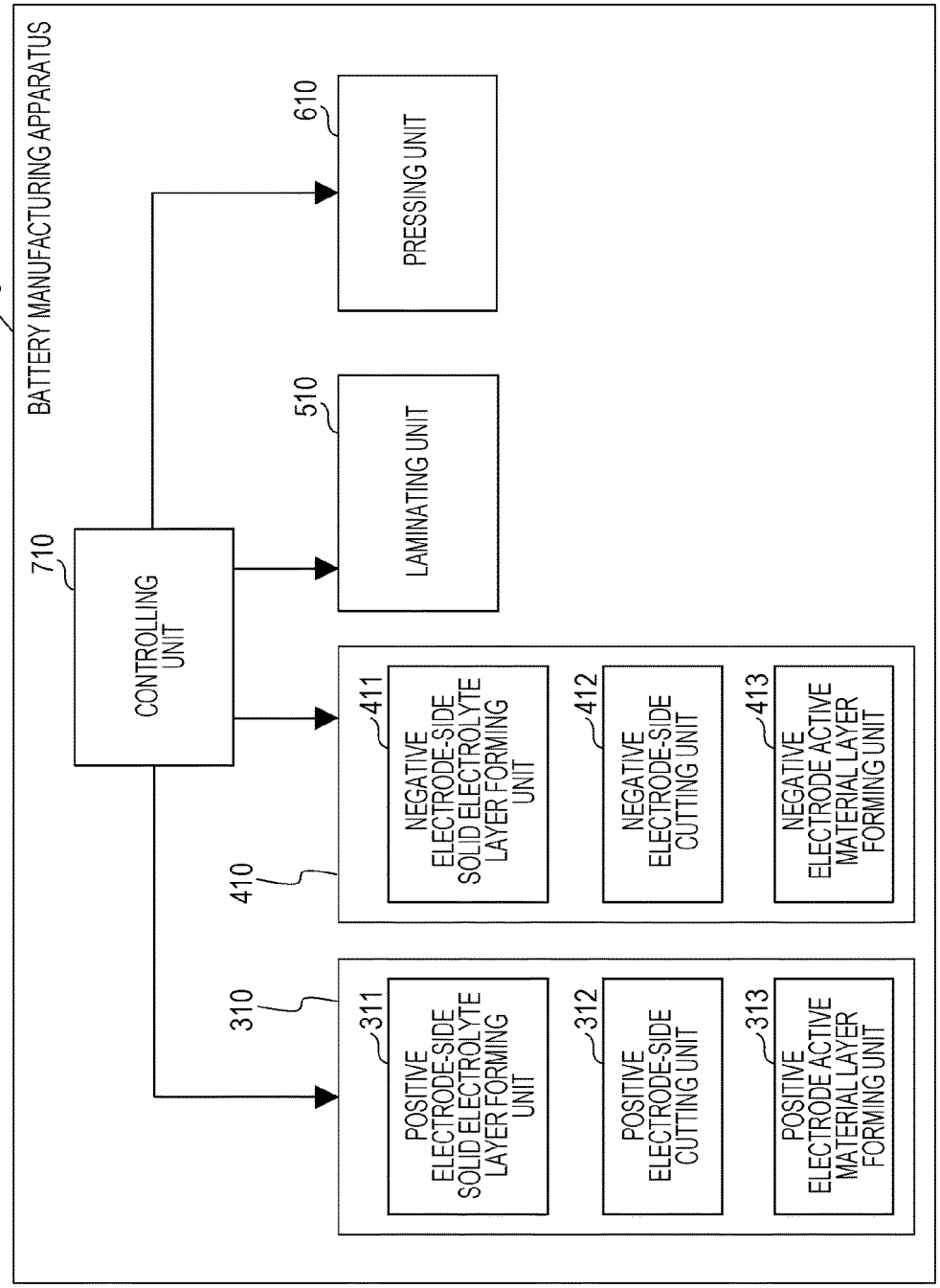
FIG. 9 is a view showing a schematic structure of a battery manufacturing apparatus of Embodiment 2.

FIG. 9 is a view showing a schematic structure of a battery manufacturing apparatus 2100 of Embodiment 2.

In the battery manufacturing apparatus 2100 of Embodiment 2, a positive electrode layer forming unit 310 includes a positive electrode-side solid electrolyte layer forming unit 311 (e.g., positive electrode-side solid electrolyte layer former) and a positive electrode-side cutting unit 312 (e.g., positive electrode-side cutter).

The positive electrode-side solid electrolyte layer forming unit 311 forms the positive electrode-side solid electrolyte layer 130 so as to be in contact with the positive electrode current collector 110 and the positive electrode active material layer 120.

The positive electrode-side cutting unit 312 cuts the positive electrode current collector 110 together with the positive electrode-side solid electrolyte layer 130 so that the positive electrode-side solid electrolyte layer 130 is formed in the same region as that of the positive electrode current collector 110.

In addition, in the battery manufacturing apparatus 2100 of Embodiment 2, a negative electrode layer forming unit 410 includes a negative electrode-side solid electrolyte layer forming unit 411 (e.g., negative electrode-side solid electrolyte layer former) and a negative electrode-side cutting unit 412 (e.g., negative electrode-side cutter).

The negative electrode-side solid electrolyte layer forming unit 411 forms the negative electrode-side solid electrolyte layer 230 so as to be in contact with the negative electrode current collector 210 and the negative electrode active material layer 220.

The negative electrode-side cutting unit 412 cuts the negative electrode current collector 210 together with the negative electrode-side solid electrolyte layer 230 so that the negative electrode-side solid electrolyte layer 230 is formed in the same region as that of the negative electrode current collector 210.

Figure 10:
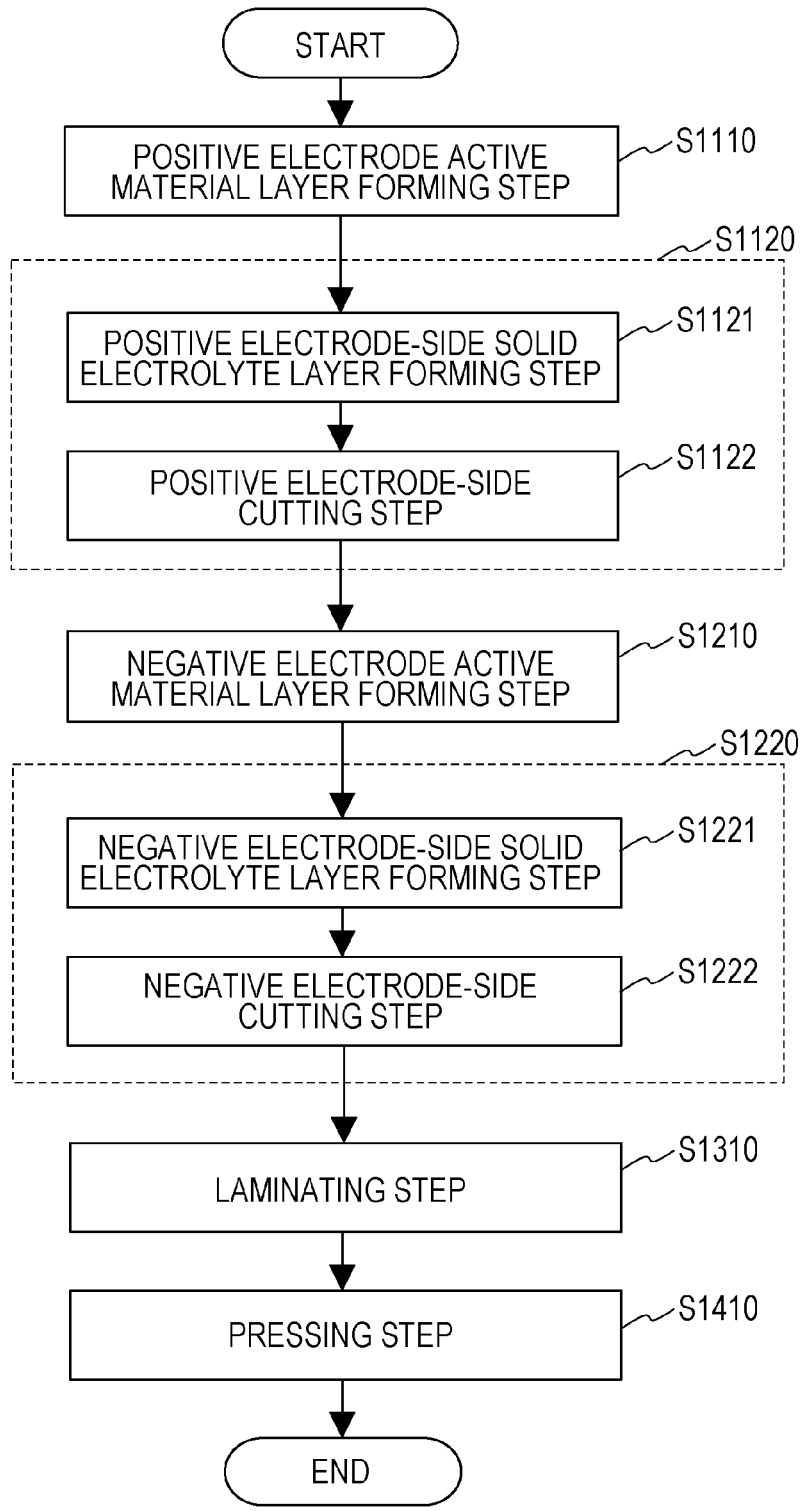
FIG. 10 is a flowchart showing a modified example of the battery manufacturing method of Embodiment 2.

FIG. 10 is a flowchart showing a modified example of the battery manufacturing method of Embodiment 2.

The battery manufacturing method shown in FIG. 10 is a battery manufacturing method using the battery manufacturing apparatus 2100 of Embodiment 2. For example, the battery manufacturing method shown in FIG. 10 is a battery manufacturing method to be carried out by the battery manufacturing apparatus 2100 of Embodiment 2.

In the battery manufacturing method shown in FIG. 10, a positive electrode-side solid electrolyte layer forming step S1120 (Step (a2)) includes a positive electrode-side solid electrolyte layer forming step S1121 (Step (a21)) and a positive electrode-side cutting step S1122 (Step (a22)).

The positive electrode-side solid electrolyte layer forming step S1121 is a step of forming by the positive electrode-side solid electrolyte layer forming unit 311, the positive electrode-side solid electrolyte layer 130 so as to be in contact with the positive electrode current collector 110 and the positive electrode active material layer 120.

The positive electrode-side cutting step S1122 is a step of cutting, by the positive electrode-side cutting unit 312, the positive electrode current collector 110 together with the positive electrode-side solid electrolyte layer 130 so that the positive electrode-side solid electrolyte layer 130 is formed in the same region as that of the positive electrode current collector 110. The positive electrode-side cutting step S1122 is a step to be carried out after the positive electrode-side solid electrolyte layer forming step S1121 is performed.

According to the manufacturing apparatus or the manufacturing method described above, by a simple step performed by cutting, the positive electrode-side solid electrolyte layer 130 can be formed in the same region as that of the positive electrode current collector 110. As a result, the battery manufacturing process can be more simplified, and the cost thereof can also be reduced.

In addition, in the battery manufacturing apparatus 2100 of Embodiment 2, the positive electrode layer forming unit 310 may include a positive electrode active material layer forming unit 313. The positive electrode active material layer forming unit 313 forms the positive electrode active material layer 120. That is, in a positive electrode active material layer forming step S1110, by the positive electrode active material layer forming unit 313, the positive electrode active material layer 120 may be formed.

In addition, in the battery manufacturing apparatus 2100 of Embodiment 2, the negative electrode layer forming unit 410 may include a negative electrode active material layer forming unit 413. The negative electrode active material layer forming unit 413 forms the negative electrode active material layer 220. That is, in a negative electrode active material layer forming step S1210, by the negative electrode active material layer forming unit 413, the negative electrode active material layer 220 may be formed.

Figure 11:
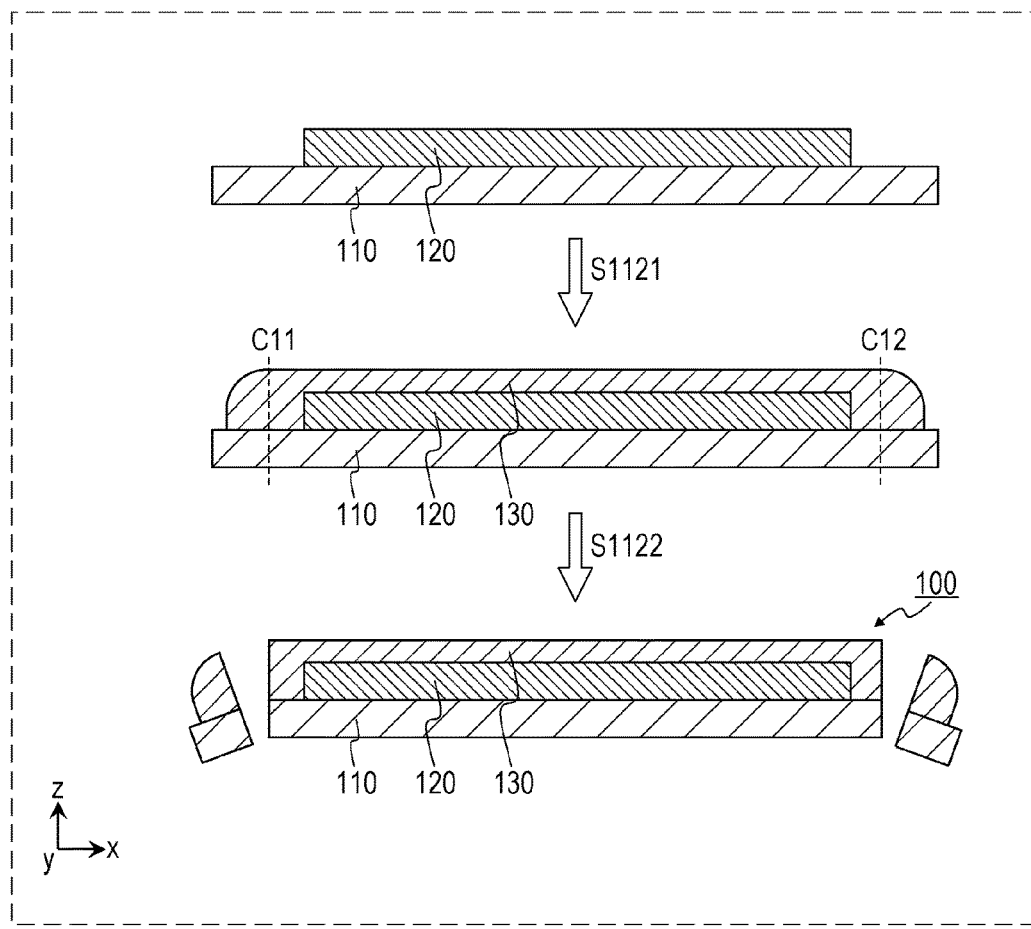
FIG. 11 is a view showing one example of a positive electrode-side solid electrolyte layer forming step S1121 and a positive electrode-side cutting step S1122.

FIG. 11 is a view showing one example of the positive electrode-side solid electrolyte layer forming step S1121 and the positive electrode-side cutting step S1122.

On the positive electrode current collector 110 on which the positive electrode active material layer 120 is formed, the positive electrode-side solid electrolyte layer 130 is formed. For example, a paint in the form of paste in which a positive electrode-side solid electrolyte (and other materials) is kneaded together with a predetermined solvent is applied on the positive electrode active material layer 120 and the positive electrode current collector 110 by a coating device or the like (and then may be dried). In this case, in a region smaller than that of the positive electrode current collector 110, the positive electrode-side solid electrolyte layer 130 is formed (positive electrode-side solid electrolyte layer forming step S1121).

The positive electrode current collector 110 on which the positive electrode-side solid electrolyte layer 130 is formed is cut by a cutting device or the like. The positive electrode current collector 110 is cut together with the positive electrode-side solid electrolyte layer 130 (for example, is cut at positions designated by C11 and C12 shown in FIG. 11). Accordingly, the positive electrode-side solid electrolyte layer 130 is formed in the same region as that of the positive electrode current collector 110 (positive electrode-side cutting step S1122). As a result, the positive electrode layer 100 (such as a positive electrode plate) is formed.

In addition, in the positive electrode-side cutting step S1122, the cutting may be performed by simultaneously punching out the positive electrode current collector 110 and the positive electrode-side solid electrolyte layer 130. In this case, the four edges of the positive electrode current collector 110 and the four edges of the positive electrode-side solid electrolyte layer 130 may also be simultaneously cut off.

In addition, in the positive electrode-side cutting step S1122, the cutting may be performed so that the area and the shape of the primary surface of the positive electrode layer 100 are the same as those of the primary surface of the negative electrode layer 200.

In addition, in the battery manufacturing method shown in FIG. 10, a negative electrode-side solid electrolyte layer forming step S1220 (Step (b2)) includes a negative electrode-side solid electrolyte layer forming step S1221 (Step (b21)) and a negative electrode-side cutting step S1222 (Step (b22)).

The negative electrode-side solid electrolyte layer forming step S1221 is a step of forming by the negative electrode-side solid electrolyte layer forming unit 411, the negative electrode-side solid electrolyte layer 230 so as to be in contact with the negative electrode current collector 210 and the negative electrode active material layer 220.

The negative electrode-side cutting step S1222 is a step of cutting, by the negative electrode-side cutting unit 412, the negative electrode current collector 210 together with the negative electrode-side solid electrolyte layer 230 so that the negative electrode-side solid electrolyte layer 230 is formed in the same region as that of the negative electrode current collector 210. The negative electrode-side cutting step S1222 is a step to be carried out after the negative electrode-side solid electrolyte layer forming step S1221 is performed.

According to the structure described above, by a simple step performed by cutting, the negative electrode-side solid electrolyte layer 230 and the negative electrode current collector 210 can be formed in the same region. As a result, the battery manufacturing method can be more simplified, and the cost thereof can also be reduced.

Figure 12:
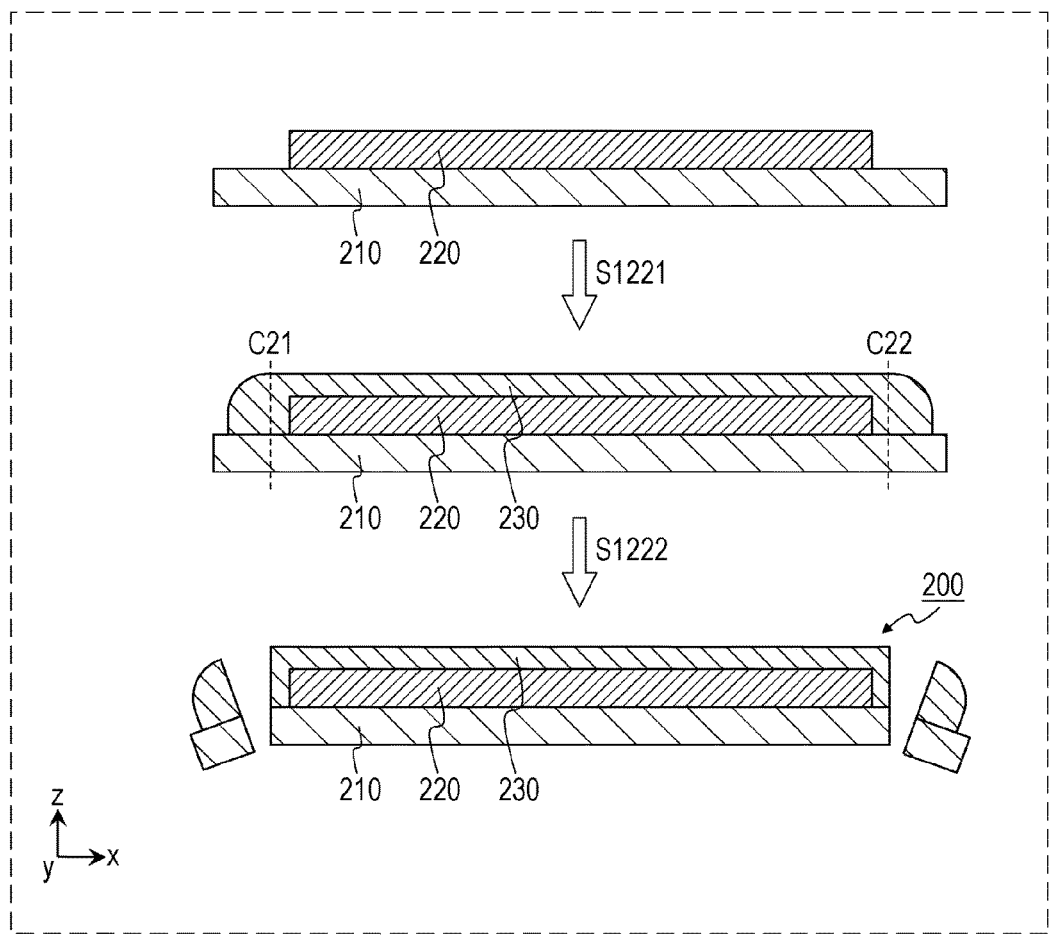
FIG. 12 is a view showing one example of a negative electrode-side solid electrolyte layer forming step S1221 and a negative electrode-side cutting step S1222.

FIG. 12 is a view showing one example of the negative electrode-side solid electrolyte layer forming step S1221 and the negative electrode-side cutting step S1222.

On the negative electrode current collector 210 on which the negative electrode active material layer 220 is formed, the negative electrode-side solid electrolyte layer 230 is formed. For example, a paint in the form of paste in which a negative electrode-side solid electrolyte (and other materials) is kneaded together with a predetermined solvent is applied on the negative electrode active material layer 220 and the negative electrode current collector 210 by a coating device or the like (and then may be dried). In this case, in a region smaller than that of the negative electrode current collector 210, the negative electrode-side solid electrolyte layer 230 is formed (negative electrode-side solid electrolyte layer forming step S1221).

The negative electrode current collector 210 on which the negative electrode-side solid electrolyte layer 230 is formed is cut by a cutting device or the like. The negative electrode current collector 210 is cut together with the negative electrode-side solid electrolyte layer 230 (for example, is cut at positions designated by C21 and C22 shown in FIG. 12). Accordingly, the negative electrode-side solid electrolyte layer 230 is formed in the same region as that of the negative electrode current collector 210 (negative electrode-side cutting step S1222). As a result, the negative electrode layer 200 (such as a negative electrode plate) is formed.

In addition, in the negative electrode-side cutting step S1222, the cutting may be performed by simultaneously punching out the negative electrode current collector 210 and the negative electrode-side solid electrolyte layer 230. In this case, the four edges of the negative electrode current collector 210 and the four edges of the negative electrode-side solid electrolyte layer 230 may also be simultaneously cut off.

In addition, in the negative electrode-side cutting step S1222, the cutting may be performed so that the area and the shape of the primary surface of the negative electrode layer 200 are the same as those of the primary surface of the positive electrode layer 100.

In addition, in Embodiment 2, the positive electrode layer forming unit 310 (such as the positive electrode-side solid electrolyte layer forming unit 311 and the positive electrode active material layer forming unit 313) and the negative electrode layer forming unit 410 (such as the negative electrode-side solid electrolyte layer forming unit 411 and the negative electrode active material layer forming unit 413) each may include, for example, an ejecting mechanism (such as an ejecting port) ejecting a coating agent (such as an active material or a solid electrolyte material), a supplying mechanism (such as a tank and a supply pipe) supplying the coating agent to the ejecting mechanism, a transporting mechanism (such as a roller) transporting an object to be coated or the like, and a pressing mechanism (such as a pressing stage and a cylinder) performing pressure application. As those mechanisms, generally known devices and members may be appropriately used.

In addition, in Embodiment 2, the positive electrode-side cutting unit 312 and the negative electrode-side cutting unit 412 each may include, for example, a cutting mechanism (such as a die punching device) cutting a cut object to be cut and a transporting mechanism (such as a roller) transporting the cut object. As those mechanisms, generally known devices and members may be appropriately used.

In addition, in Embodiment 2, the laminating unit 510 may include a transporting mechanism (such as a roller) transporting the positive electrode layer 100 and the negative electrode layer 200, each of which is an object to be laminated, and the like. As those mechanisms, generally known devices and members may be appropriately used.

In addition, in Embodiment 2, the pressing unit 610 may include, for example, a pressing mechanism (such as a pressing stage and a cylinder) performing pressure application on the laminate of the positive electrode layer 100 and the negative electrode layer 200, and a transporting mechanism (such as a roller) transporting the positive electrode layer 100 and the negative electrode layer 200, each of which is an object to be laminated. As those mechanisms, generally known devices and members may be appropriately used.

In addition, the battery manufacturing apparatus of Embodiment 2 may further include a controlling unit 710 (e.g., controller). The controlling unit 710 controls the movement of the positive electrode layer forming unit 310 (such as the positive electrode-side solid electrolyte layer forming unit 311 and the positive electrode-side cutting unit 312), the negative electrode layer forming unit 410 (such as the negative electrode-side solid electrolyte layer forming unit 411 and the negative electrode-side cutting unit 412), the laminating unit 510, and the pressing unit 610. The controlling unit 710 may be formed, for example, of a processor and a memory. The processor may be, for example, a central processing unit (CPU) or a micro-processing unit (MPU). In this case, the processor may perform a controlling method (battery manufacturing method) disclosed in the present disclosure by reading of a program stored in the memory.

Embodiment 3

Hereinafter, Embodiment 3 will be described. Description duplicated with those of the above Embodiments 1 or 2 will be appropriately omitted.

Figure 13:
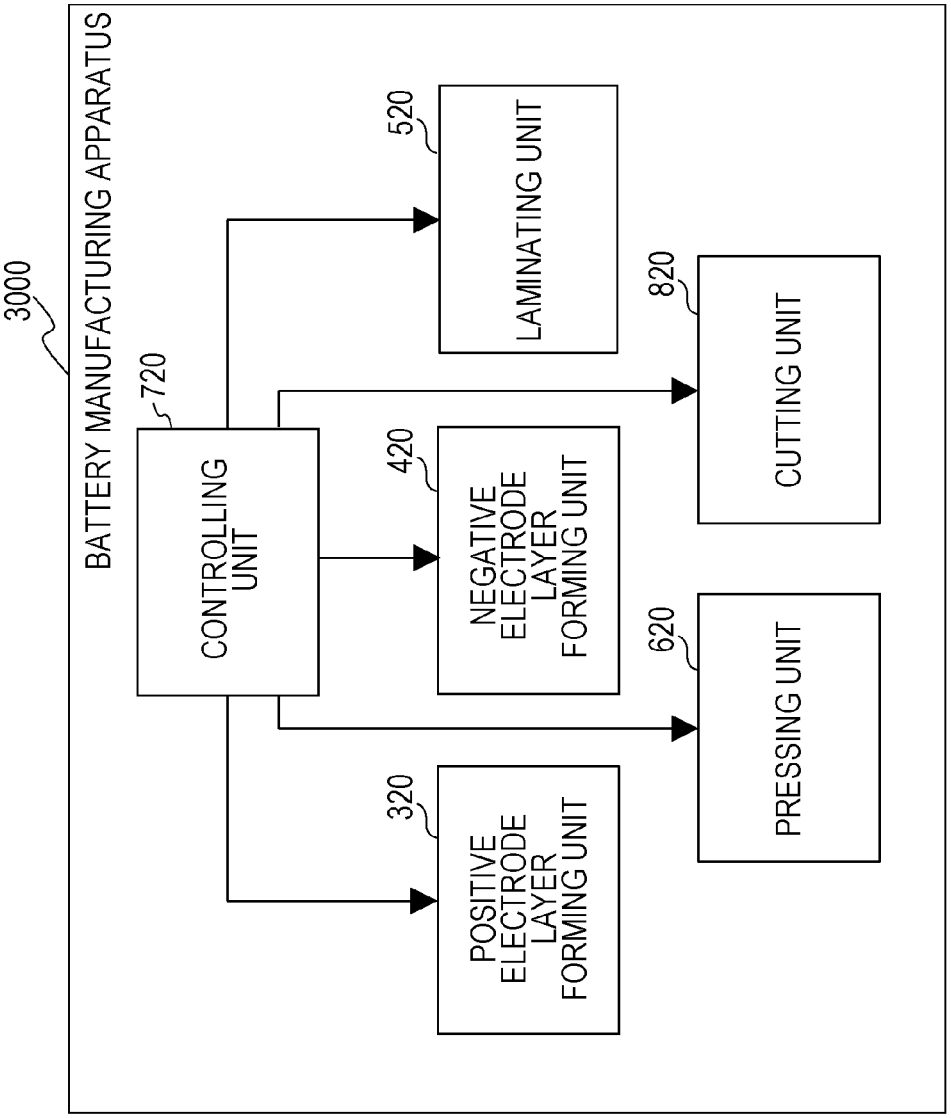
FIG. 13 is a view showing a schematic structure of a battery manufacturing apparatus of Embodiment 3.

FIG. 13 is a view showing a schematic structure of a battery manufacturing apparatus 3000 of Embodiment 3.

The battery manufacturing apparatus 3000 of Embodiment 3 includes a positive electrode layer forming unit 320 (e.g., positive electrode layer former), a negative electrode layer forming unit 420 (e.g., negative electrode layer former), and a laminating unit 520 (e.g., laminator), and a cutting unit 820 (e.g., cutter).

The positive electrode layer forming unit 320 forms the positive electrode layer 100.

The positive electrode layer forming unit 320 forms the positive electrode active material layer 120 in a region smaller than that of the positive electrode current collector 110 so as to be in contact therewith.

The positive electrode layer forming unit 320 forms the positive electrode-side solid electrolyte layer 130 so as to be in contact with the positive electrode current collector 110 and the positive electrode active material layer 120.

The negative electrode layer forming unit 420 forms the negative electrode layer 200.

The negative electrode layer forming unit 420 forms the negative electrode active material layer 220 in a region smaller than that of the negative electrode current collector 210 so as to be in contact therewith.

The negative electrode layer forming unit 420 forms the negative electrode-side solid electrolyte layer 230 so as to be in contact with the negative electrode current collector 210 and the negative electrode active material layer 220.

The laminating unit 520 laminates the positive electrode layer 100 and the negative electrode layer 200 to each other. Accordingly, the laminating unit 520 enables the positive electrode active material layer 120 to face the negative electrode active material layer 220 with (e.g., via) the positive electrode-side solid electrolyte layer 130 and the negative electrode-side solid electrolyte layer 230 provided therebetween.

The cutting unit 820 cuts the positive electrode current collector 110 and the negative electrode current collector 210 together with the positive electrode-side solid electrolyte layer 130 and the negative electrode-side solid electrolyte layer 230. Accordingly, the positive electrode-side solid electrolyte layer 130 and the positive electrode current collector 110 are formed in the same region, and the negative electrode-side solid electrolyte layer 230 and the negative electrode current collector 210 are formed in the same region.

Figure 14:
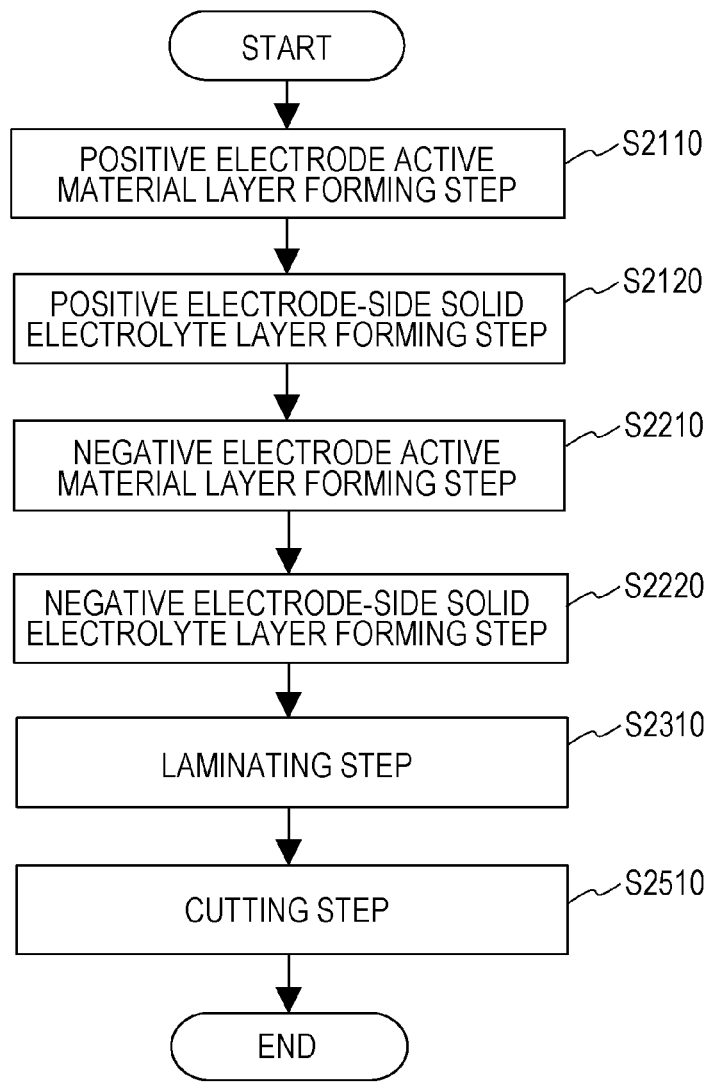
FIG. 14 is a flowchart showing a battery manufacturing method of Embodiment 3.

FIG. 14 is a flowchart showing a battery manufacturing method of Embodiment 3.

The battery manufacturing method of Embodiment 3 is a battery manufacturing method using the battery manufacturing apparatus 3000 of Embodiment 3. For example, the battery manufacturing method of Embodiment 3 is a battery manufacturing method to be carried out by the battery manufacturing apparatus 3000 of Embodiment 3.

The battery manufacturing method of Embodiment 3 includes a positive electrode active material layer forming step S2110 (Step (e1)), a positive electrode-side solid electrolyte layer forming step S2120 (Step (e2)), a negative electrode active material layer forming step S2210 (Step (f1)), a negative electrode-side solid electrolyte layer forming step S2220 (Step (f2)), a laminating step S2310 (Step (g)), and a cutting step S2510 (Step (h)).

The positive electrode active material layer forming step S2110 is a step of forming, by the positive electrode layer forming unit 320, the positive electrode active material layer 120 in a region smaller than that of the positive electrode current collector 110 so as to be in contact therewith.

The positive electrode-side solid electrolyte layer forming step S2120 is a step of forming, by the positive electrode layer forming unit 320, the positive electrode-side solid electrolyte layer 130 so as to be in contact with the positive electrode current collector 110 and the positive electrode active material layer 120. The positive electrode-side solid electrolyte layer forming step S2120 is a step to be carried out after the positive electrode active material layer forming step S2110 is performed.

The negative electrode active material layer forming step S2210 is a step of forming, by the negative electrode layer forming unit 420, the negative electrode active material layer 220 in a region smaller than that of the negative electrode current collector 210 so as to be in contact therewith.

The negative electrode-side solid electrolyte layer forming step S2220 is a step of forming, by the negative electrode layer forming unit 420, the negative electrode-side solid electrolyte layer 230 so as to be in contact with the negative electrode current collector 210 and the negative electrode active material layer 220. The negative electrode-side solid electrolyte layer forming step S2220 is a step to be carried out after the negative electrode active material layer forming step S2210 is performed.

The laminating step S2310 is a step of laminating, by the laminating unit 520, the positive electrode layer 100 and the negative electrode layer 200 so that the positive electrode active material layer 120 faces the negative electrode active material layer 220 with (e.g., via) the positive electrode-side solid electrolyte layer 130 and the negative electrode-side solid electrolyte layer 230 provided therebetween. The laminating step S2310 is a step to be carried out after the positive electrode-side solid electrolyte layer forming step S2120 and the negative electrode-side solid electrolyte layer forming step S2220 are performed.

The cutting step S2510 is a step of cutting, by the cutting unit 820, the positive electrode current collector 110 and the negative electrode current collector 210 together with the positive electrode-side solid electrolyte layer 130 and the negative electrode-side solid electrolyte layer 230 so that the positive electrode-side solid electrolyte layer 130 and the positive electrode current collector 110 are formed in the same region and the negative electrode-side solid electrolyte layer 230 and the negative electrode current collector 210 are formed in the same region. The cutting step S2510 is a step to be carried out after the laminating step S2310 is performed.

According to the manufacturing apparatus or the manufacturing method described above, the battery 1000 of Embodiment 1 can be manufactured.

According to the manufacturing apparatus or the manufacturing method described above, after the positive electrode layer 100 and the negative electrode layer 200 are laminated to each other, since the cutting is performed, the alignment between the positive electrode layer 100 and the negative electrode layer 200 can be more easily performed. In addition, for example, the positive electrode current collector 110, the positive electrode-side solid electrolyte layer 130, the negative electrode current collector 210, and the negative electrode-side solid electrolyte layer 230 can be simultaneously cut. Hence, the positive electrode current collector 110, the positive electrode-side solid electrolyte layer 130, the negative electrode current collector 210, and the negative electrode-side solid electrolyte layer 230 can be formed in the same region. Accordingly, the stability of the positions of the positive electrode current collector 110 and the negative electrode current collector 210 can be more enhanced, and furthermore, the probability of contact between the positive electrode current collector 110 and the negative electrode current collector 210 can be more reduced.

Furthermore, according to the manufacturing apparatus or the manufacturing method described above, the probability of contact between the positive electrode current collector 110 and the negative electrode current collector 210 can be reduced. That is, the portion of the positive electrode current collector 110 and the portion of the negative electrode current collector 210 facing each other can be fixed by the positive electrode-side solid electrolyte layer 130 and the negative electrode-side solid electrolyte layer 230, respectively. For example, even if the positive electrode current collector 110 and the negative electrode current collector 210 are each formed of a thin film, by the positive electrode-side solid electrolyte layer 130 and the negative electrode-side solid electrolyte layer 230, the gap between the positive electrode current collector 110 and the negative electrode current collector 210 can be maintained at a predetermined distance (such as the total thickness of the positive electrode-side solid electrolyte layer 130 and the negative electrode-side solid electrolyte layer 230 or more). Hence, the positive electrode current collector 110 and the negative electrode current collector 210 can be prevented from coming close to each other. As a result, for example, even if a plurality of battery cells are laminated to each other, the positive electrode current collector 110 and the negative electrode current collector 210 can be prevented from being deformed. Hence, for example, even if a plurality of battery cells are laminated to each other, the positive electrode current collector 110 and the negative electrode current collector 210 can be prevented from being short-circuited to each other. In addition, for example, even in the case of an all-sold battery in which no separators are provided between the positive electrode layer 100 and the negative electrode layer 200, the risk of short circuit caused by direct contact between the positive electrode current collector 110 and the negative electrode current collector 210 can be reduced.

Furthermore, according to the manufacturing apparatus or the manufacturing method described above, no additional members (such as insulating spacer) insulating the positive electrode layer 100 and the negative electrode layer 200 are not necessary. As a result, the battery manufacturing process can be more simplified, and the cost thereof can also be reduced.

Furthermore, according to the manufacturing apparatus or the manufacturing method described above, since the solid electrolyte layer obtained by bonding the positive electrode-side solid electrolyte layer 130 to the negative electrode-side solid electrolyte layer 230 is provided, for example, the probability of short circuit caused by pinholes to be generated in the positive electrode-side solid electrolyte layer 130 and the negative electrode-side solid electrolyte layer 230 in manufacturing can be reduced.

In addition, according to the manufacturing apparatus or the manufacturing method described above, by a simple step performed by cutting, the positive electrode current collector 110, the positive electrode-side solid electrolyte layer 130, the negative electrode current collector 210, and the negative electrode-side solid electrolyte layer 230 can be formed in the same region. As a result, the battery manufacturing process can be more simplified, and the cost thereof can also be reduced.

In addition, in the battery manufacturing apparatus 3000 of Embodiment 3, the negative electrode layer forming unit 420 may form the negative electrode active material layer 220 in a region larger than that of the positive electrode active material layer 120. In this case, the laminating unit 520 may arrange the positive electrode active material layer 120 within the region in which the negative electrode active material layer 220 is formed.

In other words, in the battery manufacturing method of Embodiment 3, in the negative electrode active material layer forming step S2210, by the negative electrode layer forming unit 420, the negative electrode active material layer 220 may be formed in a region larger than that of the positive electrode active material layer 120.

In this case, in the laminating step S2310, by the laminating unit 520, the positive electrode active material layer 120 may be arranged within the region in which the negative electrode active material layer 220 is formed.

According to the structure described above, precipitation of a metal (such as lithium) at the negative electrode active material layer 220 can be suppressed. Hence, the short circuit between the positive electrode layer 100 and the negative electrode layer 200 caused by the metal precipitation can be prevented.

In addition, in Embodiment 3, as shown in FIG. 14, the negative electrode active material layer forming step S2210 and the negative electrode-side solid electrolyte layer forming step S2220 may be performed after the positive electrode active material layer forming step S2110 and the positive electrode-side solid electrolyte layer forming step S2120 are performed.

Alternatively, the negative electrode active material layer forming step S2210 and the negative electrode-side solid electrolyte layer forming step S2220 may be performed before the positive electrode active material layer forming step S2110 and the positive electrode-side solid electrolyte layer forming step S2120 are performed.

Alternatively, the negative electrode active material layer forming step S2210 and the negative electrode-side solid electrolyte layer forming step S2220 may be simultaneously performed in parallel with the positive electrode active material layer forming step S2110 and the positive electrode-side solid electrolyte layer forming step S2120.

Hereinafter, a concrete example of the battery manufacturing method of Embodiment 3 will be described.

Figure 15:
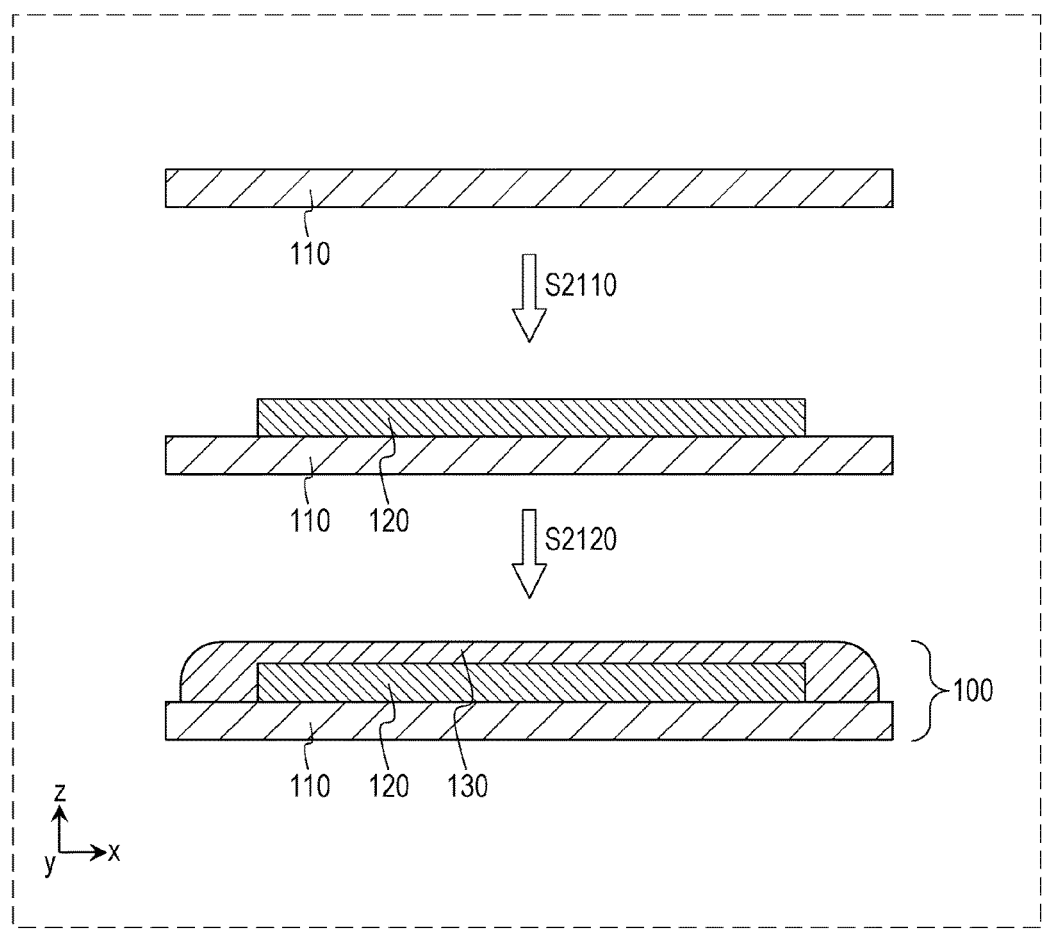
FIG. 15 is a view showing one example of a positive electrode active material layer forming step S2110 and a positive electrode-side solid electrolyte layer forming step S2120.

FIG. 15 is a view showing one example of the positive electrode active material layer forming step S2110 and the positive electrode-side solid electrolyte layer forming step S2120.

On the positive electrode current collector 110 prepared in advance, the positive electrode active material layer 120 is formed. For example, a paint in the form of paste in which a positive electrode active material (and other materials) is kneaded together with a predetermined solvent is applied on the positive electrode current collector 110 by a coating device or the like (and then may be dried). In this case, the positive electrode active material layer 120 is formed in a region smaller than that of the positive electrode current collector 110 so as to be in contact therewith (positive electrode active material layer forming step S2110). Accordingly, on the positive electrode current collector 110, the positive electrode active material layer 120 is formed so as to expose the periphery of the positive electrode current collector 110.

On the positive electrode current collector 110 on which the positive electrode active material layer 120 is formed, the positive electrode-side solid electrolyte layer 130 is formed. For example, a paint in the form of paste in which a positive electrode-side solid electrolyte (and other materials) is kneaded with a predetermined solvent is applied on the positive electrode active material layer 120 and the positive electrode current collector 110 by a coating device or the like (and then may be dried). In this case, the positive electrode-side solid electrolyte layer 130 is formed in a region smaller than that of the positive electrode current collector 110 (positive electrode-side solid electrolyte layer forming step S2120). Accordingly, on the exposed positive electrode current collector 110, the positive electrode-side solid electrolyte layer 130 is formed so as to cover the positive electrode active material layer 120. As a result, the positive electrode layer 100 (such as a positive electrode plate) is formed.

Figure 16:
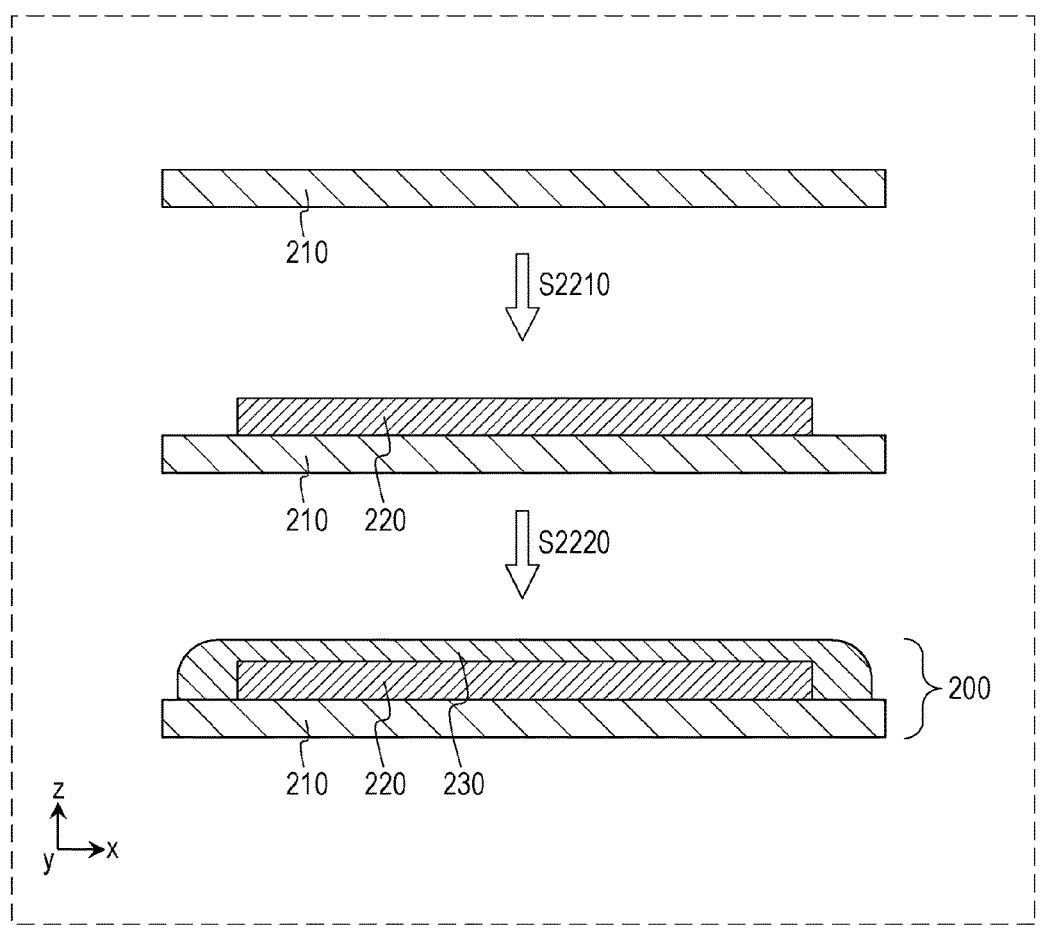
FIG. 16 is a view showing one example of a negative electrode active material layer forming step S2210 and a negative electrode-side solid electrolyte layer forming step S2220.

FIG. 16 is a view showing one example of the negative electrode active material layer forming step S2210 and the negative electrode-side solid electrolyte layer forming step S2220.

On the negative electrode current collector 210 prepared in advance, the negative electrode active material layer 220 is formed. For example, a paint in the form of paste in which a negative electrode active material (and other materials) is kneaded together with a predetermined solvent is applied on the negative electrode current collector 210 by a coating device or the like (and then may be dried). In this case, the negative electrode active material layer 220 is formed in a region smaller than that of the negative electrode current collector 210 so as to be in contact therewith (negative electrode active material layer forming step S2210). Accordingly, on the negative electrode current collector 210, the negative electrode active material layer 220 is formed so as to expose the periphery of the negative electrode current collector 210. In addition, in the example shown in FIG. 16, the negative electrode active material layer 220 is formed in a region larger than that of the positive electrode active material layer 120 (that is, in a region larger than that in which the positive electrode active material layer 120 is formed).

On the negative electrode current collector 210 on which the negative electrode active material layer 220 is formed, the negative electrode-side solid electrolyte layer 230 is formed. For example, a paint in the form of paste in which a negative electrode-side solid electrolyte (and other materials) is kneaded with a predetermined solvent is applied on the negative electrode active material layer 220 and the negative electrode current collector 210 by a coating device or the like (and then may be dried). In this case, the negative electrode-side solid electrolyte layer 230 is formed in a region smaller than that of the negative electrode current collector 210 (negative electrode-side solid electrolyte layer forming step S2220). Accordingly, on the exposed negative electrode current collector 210, the negative electrode-side solid electrolyte layer 230 is formed so as to cover the negative electrode active material layer 220. As a result, the negative electrode layer 200 (such as a negative electrode plate) is formed.

Figure 17:
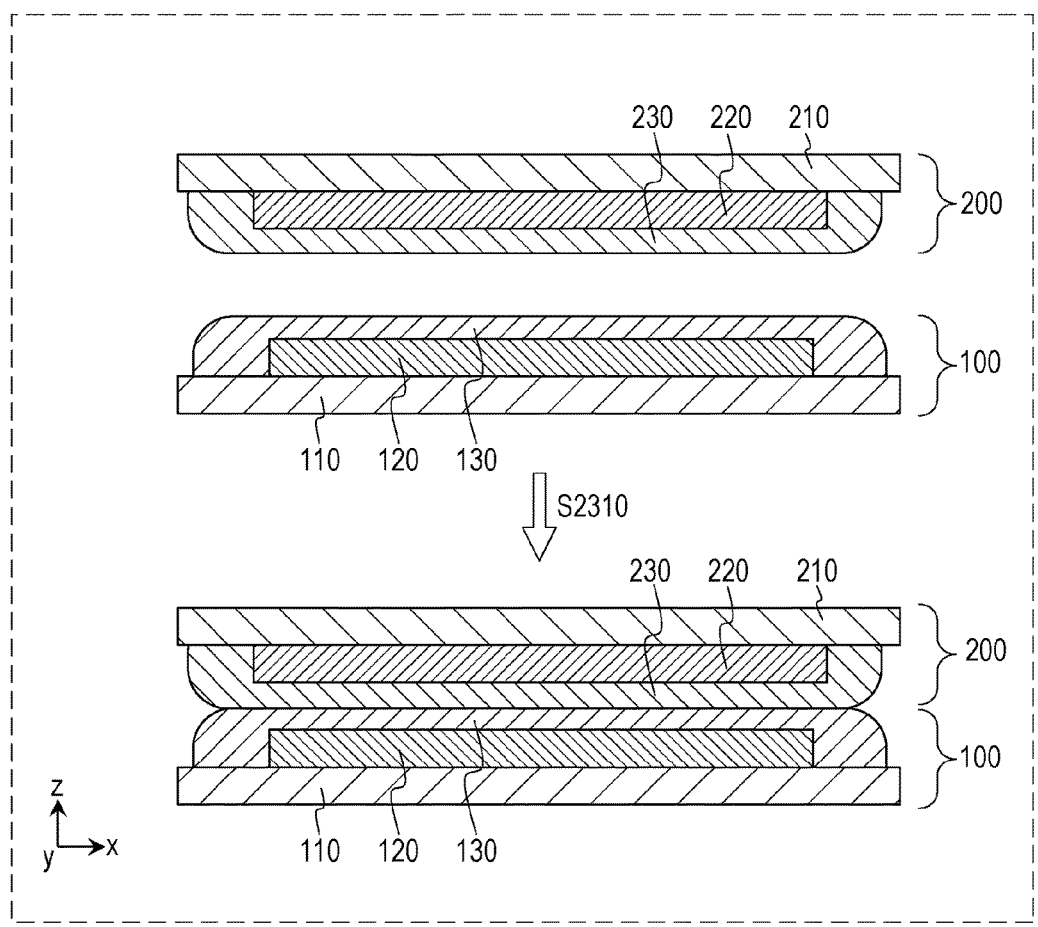
FIG. 17 is a view showing one example of a laminating step S2310.

FIG. 17 is a view showing one example of the laminating step S2310.

The positive electrode layer 100 and the negative electrode layer 200, each of which is formed as described above, are arranged using a transporting device or the like so as to face each other. Subsequently, the positive electrode layer 100 and the negative electrode layer 200 are brought into contact with each other for lamination. Accordingly, the positive electrode active material layer 120 faces the negative electrode active material layer 220 with the positive electrode-side solid electrolyte layer 130 and the negative electrode-side solid electrolyte layer 230 provided therebetween (laminating step S2310).

Figure 18:
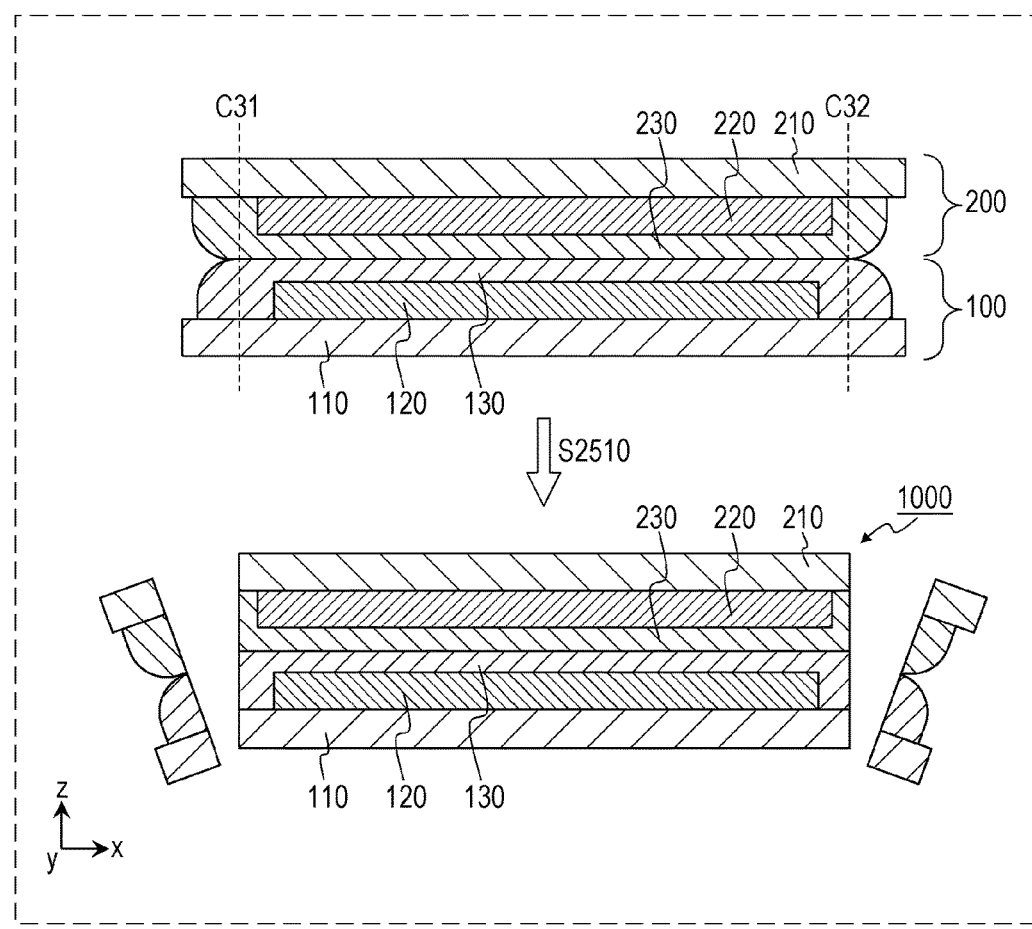
FIG. 18 is a view showing one example of a cutting step S2510.

FIG. 18 is a view showing one example of the cutting step S2510.

The laminate of the positive electrode layer 100 and the negative electrode layer 200 is cut using a cutting device or the like. The positive electrode current collector 110 and the negative electrode current collector 210 are cut together with the positive electrode-side solid electrolyte layer 130 and the negative electrode-side solid electrolyte layer 230 (for example, are cut at positions designated by C31 and C32 shown in FIG. 18). Accordingly, the positive electrode-side solid electrolyte layer 130 and the positive electrode current collector 110 are formed in the same region, and the negative electrode-side solid electrolyte layer 230 and the negative electrode current collector 210 are also formed in the same region (cutting step S2510).

The portion of the positive electrode-side solid electrolyte layer 130 and the portion of the negative electrode-side solid electrolyte layer 230 facing each other may be bonded to each other by a drying step, a pressure-bonding step, or the like. As a result, the battery 1000 of Embodiment 1 is formed.

In addition, in the cutting step S2510, the cutting may be performed by simultaneously punching out the positive electrode current collector 110, the positive electrode-side solid electrolyte layer 130, the negative electrode current collector 210, and the negative electrode-side solid electrolyte layer 230. In this case, the four edges of each of the positive electrode current collector 110, the positive electrode-side solid electrolyte layer 130, the negative electrode current collector 210, and the negative electrode-side solid electrolyte layer 230 may also be simultaneously cut off.

In addition, in the laminating step S2310, the entire primary surface of the positive electrode-side solid electrolyte layer 130 and the entire primary surface of the negative electrode-side solid electrolyte layer 230 may be brought into contact with each other (and then may be bonded to each other). Alternatively, a part (such as at least a half of the primary surface) of the primary surface of the positive electrode-side solid electrolyte layer 130 and a part (such as at least a half of the primary surface) of the primary surface of the negative electrode-side solid electrolyte layer 230 may be brought into contact with each other (and then may be bonded to each other).

Figure 19:
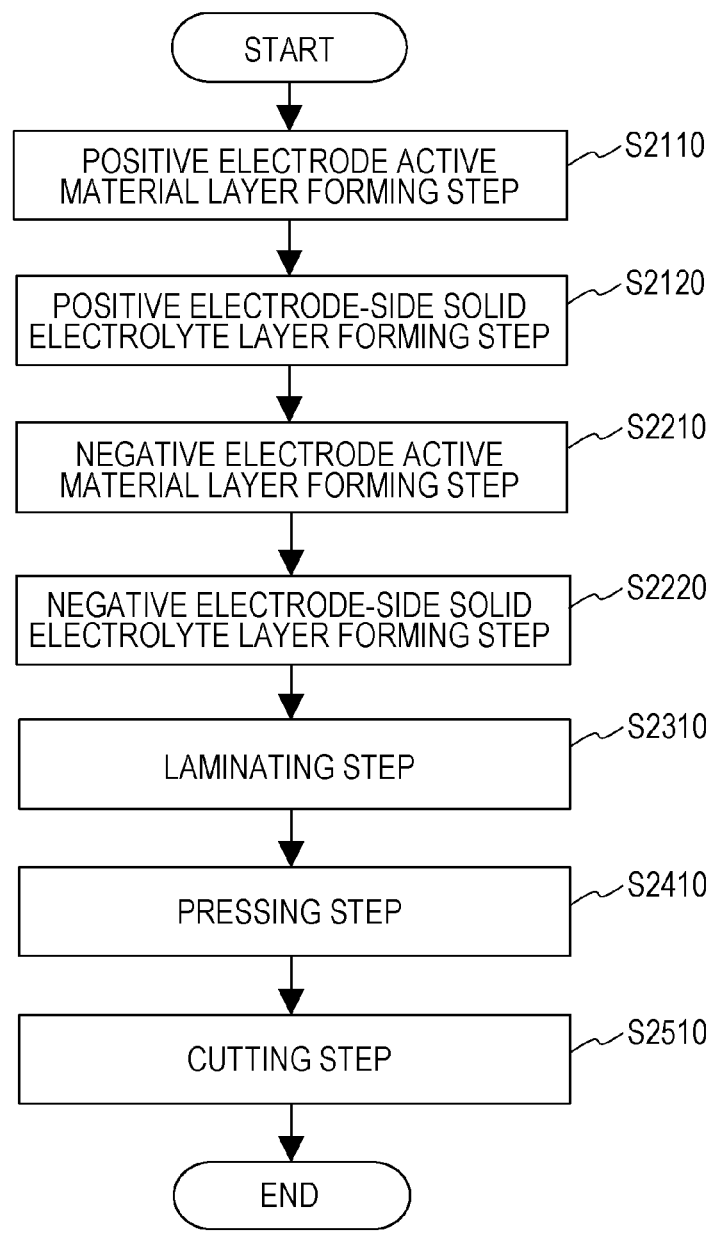
FIG. 19 is a flowchart showing a modified example of the battery manufacturing method of Embodiment 3.

FIG. 19 is a flowchart showing a modified example of the battery manufacturing method of Embodiment 3.

In Embodiment 3, as shown in FIG. 13, the battery manufacturing apparatus 3000 may further include a pressing unit 620 (e.g., pressor).

The pressing unit 620 bonds the positive electrode-side solid electrolyte layer 130 to the negative electrode-side solid electrolyte layer 230 by pressing the positive electrode layer 100 and the negative electrode layer 200 laminated thereto.

In other words, as shown in FIG. 19, the battery manufacturing method of Embodiment 3 may further include a pressing step S2410 (Step (p)).

The pressing step S2410 is a step of pressing, by the pressing unit 620, the positive electrode layer 100 and the negative electrode layer 200 laminated thereto, resulting in the positive electrode-side solid electrolyte layer 130 is bonded (pressure-bonded) to the negative electrode-side solid electrolyte layer 230.

According to the manufacturing apparatus or the manufacturing method described above, since the positive electrode-side solid electrolyte layer 130 and the negative electrode-side solid electrolyte layer 230 are tightly brought into contact with each other, the bond therebetween can be further enhanced. In addition, the probability of short circuit caused by pinholes to be generated in the positive electrode-side solid electrolyte layer 130 and the negative electrode-side solid electrolyte layer 230 can be more reduced.

In addition, in the battery manufacturing method of Embodiment 3, as shown in FIG. 19, the cutting step S2510 may be carried out after the pressing step S2410 is performed.

According to the structure described above, even in the case in which the positive electrode-side solid electrolyte layer 130 and the negative electrode-side solid electrolyte layer 230 are spread by the pressing step, the spreads (excessive units) of the positive electrode-side solid electrolyte layer 130 and the negative electrode-side solid electrolyte layer 230 can be removed by the cutting step to be carried out after the pressing step is performed. Hence, the positive electrode current collector 110, the positive electrode-side solid electrolyte layer 130, the negative electrode current collector 210, and the negative electrode-side solid electrolyte layer 230 can be formed in the same region. Accordingly, the stability of the positions of the positive electrode current collector 110 and the negative electrode current collector 210 can be further enhanced, and the probability of contact between the positive electrode current collector 110 and the negative electrode current collector 210 can be more reduced.

In addition, in Embodiment 3, the positive electrode layer forming unit 320 and the negative electrode layer forming unit 420 each may include, for example, an ejecting mechanism (such as an ejecting port) ejecting a coating agent (such as an active material or a solid electrolyte material), a supplying mechanism (such as a tank and a supplying pipe) supplying the coating agent to the ejecting mechanism, a transporting mechanism (such as a roller) transporting an object to be coated or the like, and a pressing mechanism (such as a pressing stage and a cylinder) performing pressure application. As those mechanisms, generally known devices and members may be appropriately used.

In addition, in Embodiment 3, the laminating unit 520 may include a transporting mechanism (such as a roller) transporting the positive electrode layer 100 and the negative electrode layer 200, each of which is an object to be laminated, and the like. As those mechanisms, generally known devices and members may be appropriately used.

In addition, in Embodiment 3, the pressing unit 620 may include a pressing mechanism (such as a pressing stage and a cylinder) pressure-bonding the positive electrode layer 100 to the negative electrode layer 200, a transporting mechanism (such as a roller) transporting the positive electrode layer 100 and the negative electrode layer 200, each of which is an object to be pressed, and the like. As those mechanisms, generally known devices and members may be appropriately used.

In addition, in Embodiment 3, the cutting unit 820 may include, for example, a cutting mechanism (such as a die punching device) cutting a cut object to be cut and a transporting mechanism (such as a roller) transporting the cut object. As those mechanisms, generally known devices and members may be appropriately used.

In addition, the battery manufacturing apparatus 3000 of Embodiment 3 may further include a controlling unit 720 (e.g., controller).

The controlling unit 720 controls the movement of the positive electrode layer forming unit 320, the negative electrode layer forming unit 420, the laminating unit 520, the pressing unit 620, and the cutting unit 820.

The controlling unit 720 may be, for example, formed of a processor and a memory. The processor may be, for example, a CPU or a MPU. In this case, the processor may perform a controlling method (battery manufacturing method) disclosed in the present disclosure by reading of a program stored in the memory.

In addition, in Embodiments 2 and 3, the step of forming the positive electrode layer or the negative electrode layer may include a step of forming a slurry in which an active material is dissolved in a solvent (or is mixed with a dispersed binder). In addition, in the slurry, a solid electrolyte or an electrically conductive auxiliary agent may be mixed. In this case, as the step of forming the positive electrode layer or the negative electrode layer, a known coating method, such as a doctor blade method, a roll coater method, a bar coater method, a calendar printing method, or a screen printing method, may be used.

In addition, in Embodiments 2 and 3, the step of forming the solid electrolyte layer may include a step of forming a slurry in which a solid electrolyte is dissolved in a solvent (or is mixed with a dispersed binder). In this case, as the step of forming the solid electrolyte layer, a known coating method, such as a doctor blade method, a roll coater method, a bar coater method, a calendar printing method, or a screen printing method, may be used.

In addition, in Embodiments 2 and 3, as the cutting step, a known cutting method, such as a punching method (such as die punching) may be used.

In addition, in Embodiments 2 and 3, as the pressing step (such as a pressure-bonding step), a known pressing method, such as a uniaxial press, a roll press, a cold isostatic press (CIP), or a hot isostatic press, may be used. In addition, when a uniaxial press or a roll press is used, a heat application step may be performed.

In addition, in Embodiments 1 to 3, "the solid electrolyte layer is arranged in the same region as that of the of the current collector" indicates that "the solid electrolyte layer is arranged in substantially the same region as that of the current collector excluding errors inevitably generated in manufacturing".

In addition, in Embodiments 1 to 3, "the solid electrolyte layer is formed in the same region as that of the current collector" indicates that "the solid electrolyte layer is formed in substantially the same region as that of the current collector excluding errors inevitably generated in manufacturing".

The battery of the present disclosure may be used, for example, as an all-solid lithium secondary battery.

What is claimed is:

1. A battery comprising:
a positive electrode layer; and
a negative electrode layer, wherein:
the positive electrode layer includes a positive electrode current collector, a positive electrode active material layer, and a positive electrode-side solid electrolyte layer,
the positive electrode active material layer is in contact with the positive electrode current collector and is arranged in a region smaller than that of the positive electrode current collector,
the positive electrode-side solid electrolyte layer is in contact with the positive electrode current collector and the positive electrode active material layer and is arranged in a same region as that of the positive electrode current collector,
the negative electrode layer includes a negative electrode current collector, a negative electrode active material layer, and a negative electrode-side solid electrolyte layer,
the negative electrode active material layer is in contact with the negative electrode current collector and is arranged in a region smaller than that of the negative electrode current collector,
the negative electrode-side solid electrolyte layer is in contact with the negative electrode current collector and the negative electrode active material layer and is arranged in a same region as that of the negative electrode current collector,
the positive electrode layer and the negative electrode layer are laminated to each other,
the positive electrode active material layer faces the negative electrode active material layer with the positive electrode-side solid electrolyte layer and the negative electrode-side solid electrolyte layer provided therebetween,
the positive electrode-side solid electrolyte layer and the negative electrode-side solid electrolyte layer are bonded to each other,
the negative electrode active material layer is arranged in a region larger than that of the positive electrode active material layer,
the positive electrode active material layer is arranged within a region in which the negative electrode active material layer is formed,
the positive electrode-side solid electrolyte layer includes a first pinhole,
the negative electrode-side solid electrolyte layer includes a second pinhole,
the first pinhole is blocked by the negative electrode-side solid electrolyte layer, and
the second pinhole is blocked by the positive electrode-side solid electrolyte layer.

* * * * *